Figure 1:
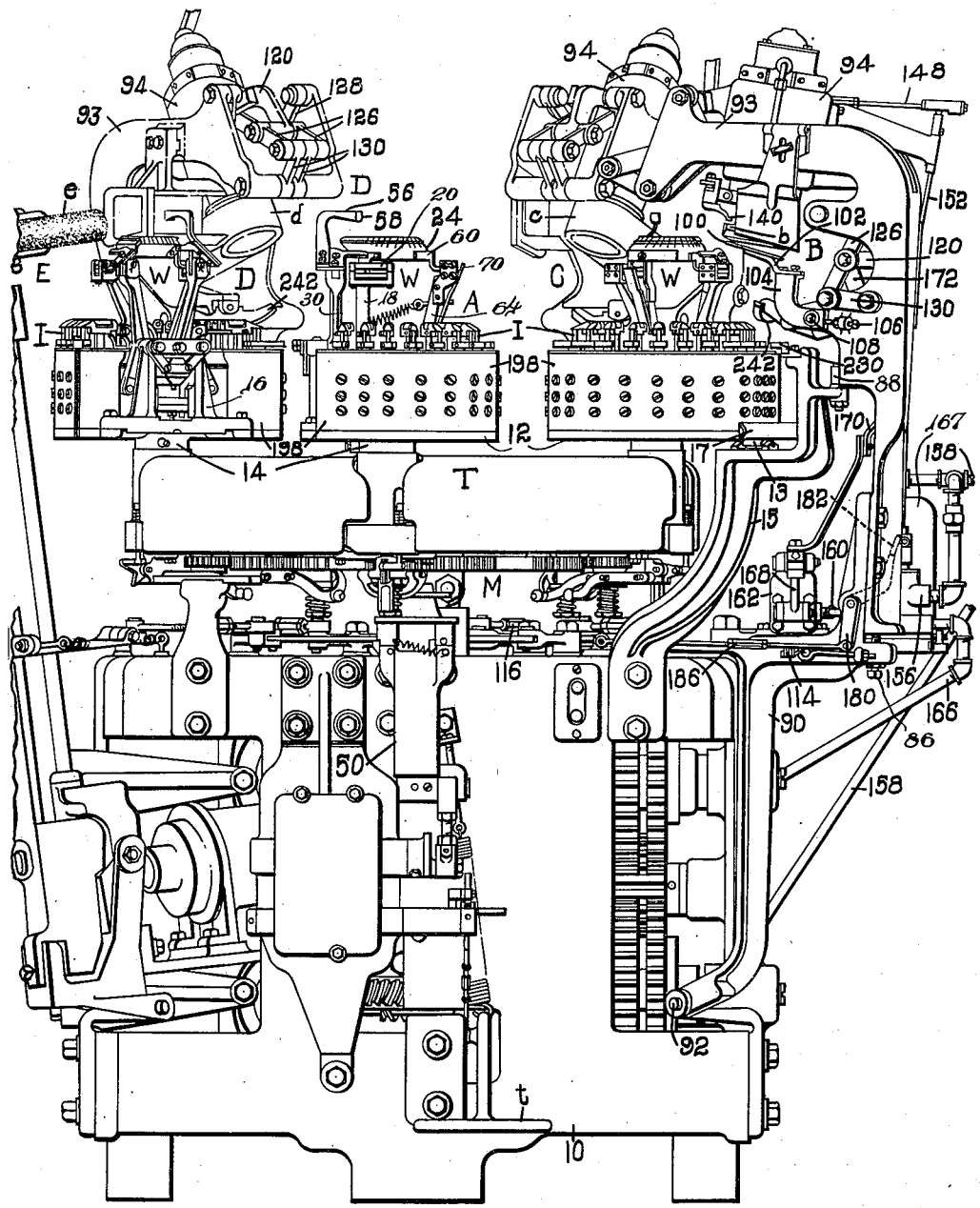

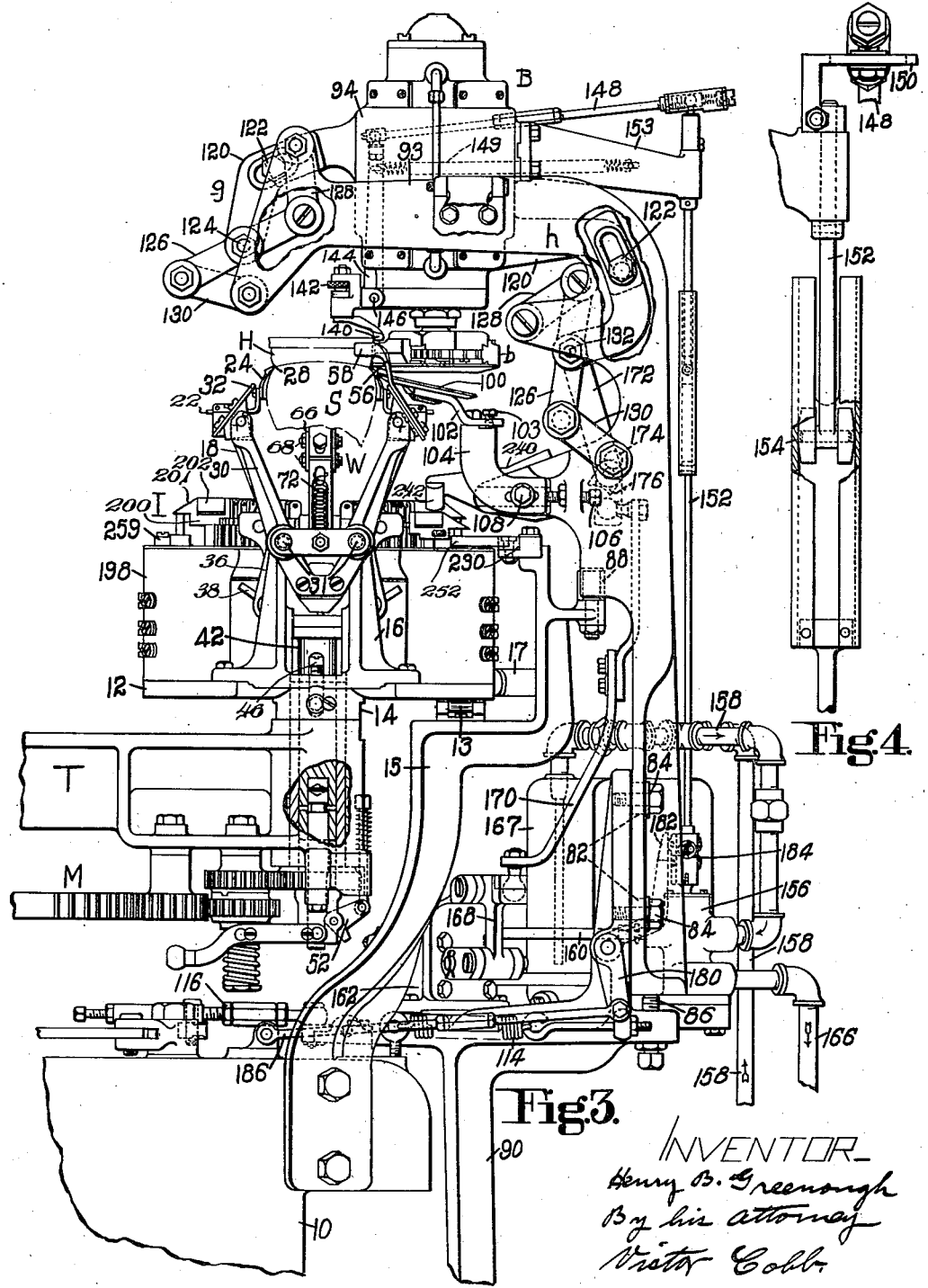

Oct. 14, 1941.   H. B. GREENOUGH   2,258,703
MACHINE FOR OPERATING UPON SHOES
Filed Aug. 25, 1939   12 Sheets-Sheet 4

INVENTOR
Henry B. Greenough
By his attorney
Victor Cobb

Oct. 14, 1941.  H. B. GREENOUGH  2,258,703
MACHINE FOR OPERATING UPON SHOES
Filed Aug. 25, 1939  12 Sheets-Sheet 5

INVENTOR
Henry B. Greenough
By his attorney
Victor Cobb

INVENTOR
Henry B. Greenough
By his attorney
Victor Cole

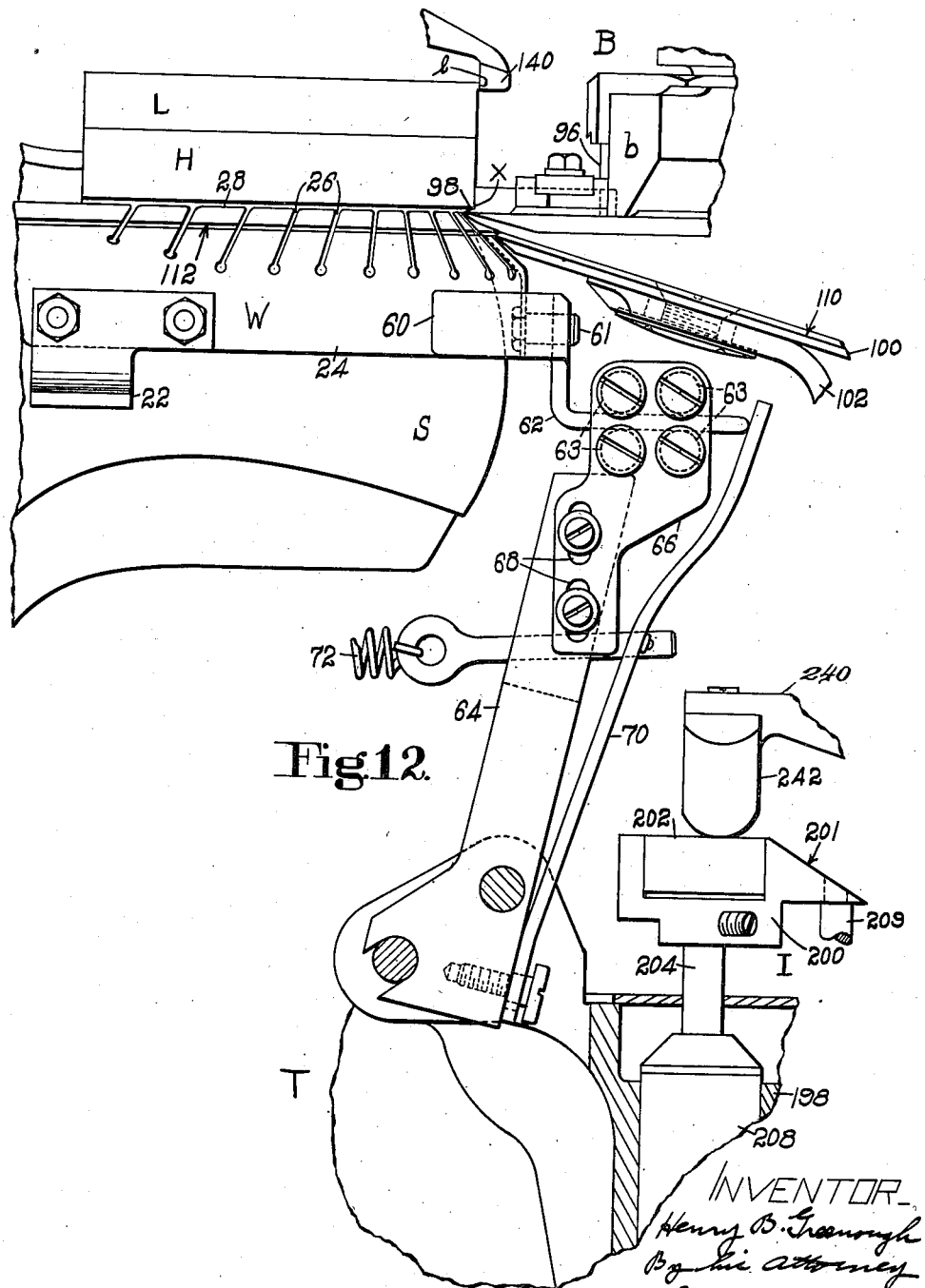

Oct. 14, 1941.  H. B. GREENOUGH  2,258,703
MACHINE FOR OPERATING UPON SHOES
Filed Aug. 25, 1939  12 Sheets—Sheet 8

INVENTOR
Henry B. Greenough
By his attorney
Victor Cobb

Oct. 14, 1941.　　　H. B. GREENOUGH　　　2,258,703
MACHINE FOR OPERATING UPON SHOES
Filed Aug. 25, 1939　　　12 Sheets-Sheet 12
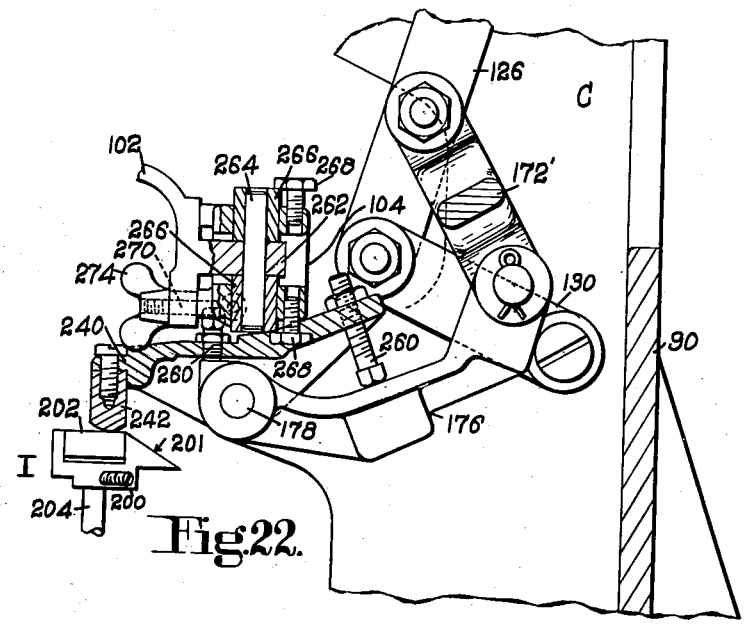
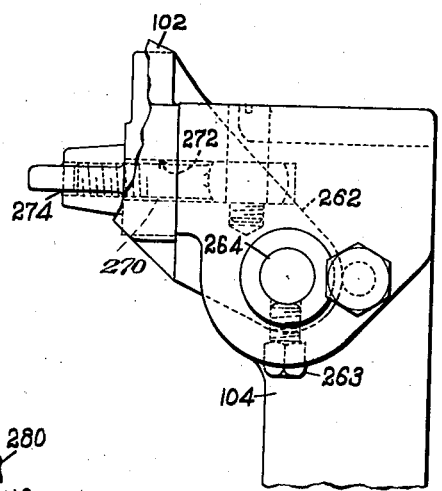
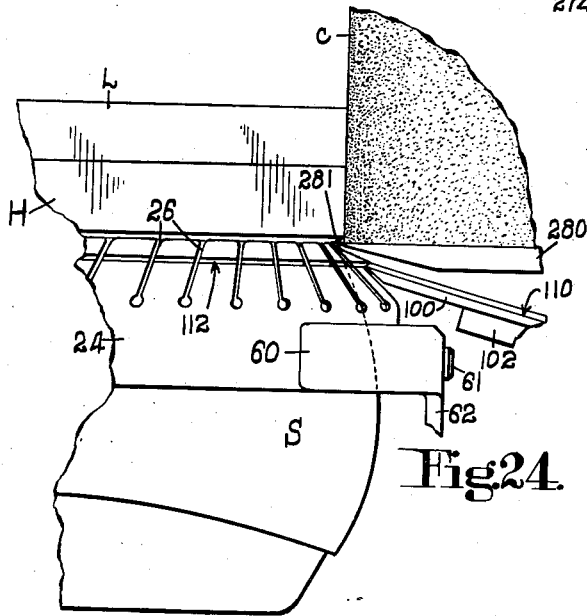

UNITED STATES PATENT OFFICE 2,258,703

MACHINE FOR OPERATING UPON SHOES

Henry B. Greenough, Beverly, Mass., assignor to United Shoe Machinery Corporation, Borough of Flemington, N. J., a corporation of New Jersey Application August 25, 1939, Serial No. 291,942

93 Claims. (Cl. 12—42)

My invention relates to machines by which operations are performed upon shoes, it being particularly applicable to operating upon the bottom-edges, as, for example, in removing material from the peripheries of heels by trimming and scouring.

The curved peripheral walls of shoe-heels may lie at angles to the vertical axes of the heels varying widely at different points about a heel and in heels of different types. It is an object of this invention to cause a tool or tools, which are to operate upon such a shoe-bottom-edge as that of a heel, to assume, with respect to its periphery, angles which it may have or which it is desired that it shall have, this being accomplished accurately by mechanisms in which complication is minimized.

In the attainment of this object, as a feature of the invention, I combine with a shoe-support and a rotatable tool, as a trimming cutter for operating upon the bottom-edge of a supported shoe, the support and shoe being movable relatively to carry the point of operation of the tool about the edge, means contacting with the bottom-edge for determining the angle between the operating portion of the tool and said edge. This bottom-edge with which contact is had may be upon an attached top-lift, a feeler being shown as engaging it and controlling hydraulic or other motor mechanism which accurately effects the angular variation of the tool. This tool is preferably driven by a motor-shaft, the motor being mounted upon a linkage or linkages so arranged as to vary the angle of the operating portion of the tool to the periphery of the heel being operated upon about points in a predetermined line. As illustrated, the motor, with its driven tool, is mounted for oscillation upon a carrier which is movable toward and from the work-support between inactive and active positions, the latter position being determined by contact of a gage member on the carrier with the work-support. Oscillation of the tool in an active position may be controlled, as previously indicated, during operation upon the work. This oscillatory movement is also preferably utilized to present the tool more advantageously to the work, and this may be effected, if desired, by the same actuating mechanism.

As another feature of the invention, and this is not necessarily limited to operations upon the bottom-edges of shoes, there is associated with a tool, which operates at different points about supported work and also in different positions at different points, a device having a controlling surface variable in form, together with means for transmitting movements of the tool to the device to change the form of the controlling surface as the point of operation of the tool changes. By this means, a record is created of the tool-movements during an operating cycle or a portion of a cycle, and this may be caused to produce similar movements of another tool by very simple means. Herein is disclosed a cam having movable sections furnishing a controlling surface, and means for transmitting movements of a tool to the sections to change their positions. The form of the cam or other device is temporarily retained and then released when it has served its purpose. As illustrated, the cam-sections are carried by pistons operating in cylinders and are normally elevated by springs, the flow between opposite ends of the cylinders being governed by valves to lock and unlock the sections.

My invention preferably takes the form of a multi-station, turret-type machine. In such an organization, the variable controlling device or cam is adjusted or set at one station, thereafter altering the effect of an operating mechanism upon the work at another than the adjusting station. The adjustment may be made during the operation of a tool in different positions thereat and employed at succeeding stations to govern the action of another tool or tools. More specifically, in connection with operations performed upon shoes, we have a rotatable turret, a series of shoe-supports rotatable on the turret, a cam rotatable with the turret and consisting of a series of variable sections generally corresponding to the peripheral contour of a heel, a series of stations having tools to which the work-supports are presented successively by the turret, a member movable with the tool at one station for positioning the sections of the cam, and a member engaging the positioned cam for moving the tool at another station. The tool, the positioning of which effects the setting of the cam, may be a trimming cutter, which is itself governed by a feeler contacting with the heel, while at the succeeding stations may be scouring tools controlled by said cam. In this turret machine, the carriers of the operating mechanisms at the successive stations are preferably guided by contact with the same surface of a work-support, and the oscillations of all the tools by such mechanisms upon their carriers are about points in the same line determined by the tool-mountings, independently of engagement with the work.

It is important, in operating upon work in the manner hereinbefore indicated, that it shall be held firmly against displacement. A further feature of my invention may be found in a support for the work. I combine with a tool which transmits its movement to a controlling device to change its form, a support which is constructed and arranged to hold work in a predetermined relation to said controlling device. With such device in its preferred embodiment, this being a cam extending about the support, said support has opposite controlling portions movable toward and from each other to locate a shoe symmetrically with respect to the cam. There is also a breast-gage for a shoe-heel, together with means for forcing the heel-breast against the gage to locate the work in a definite position longitudinally. Preferably a band surrounds the counter-portion of the shoe and has guides permitting movement of its rear and sides. When a shoe has been correctly located and clamped, as by levers acting upon the sides of the band, said sides may be held against separation and release of the work by locks applied to the levers.

Figure 2:
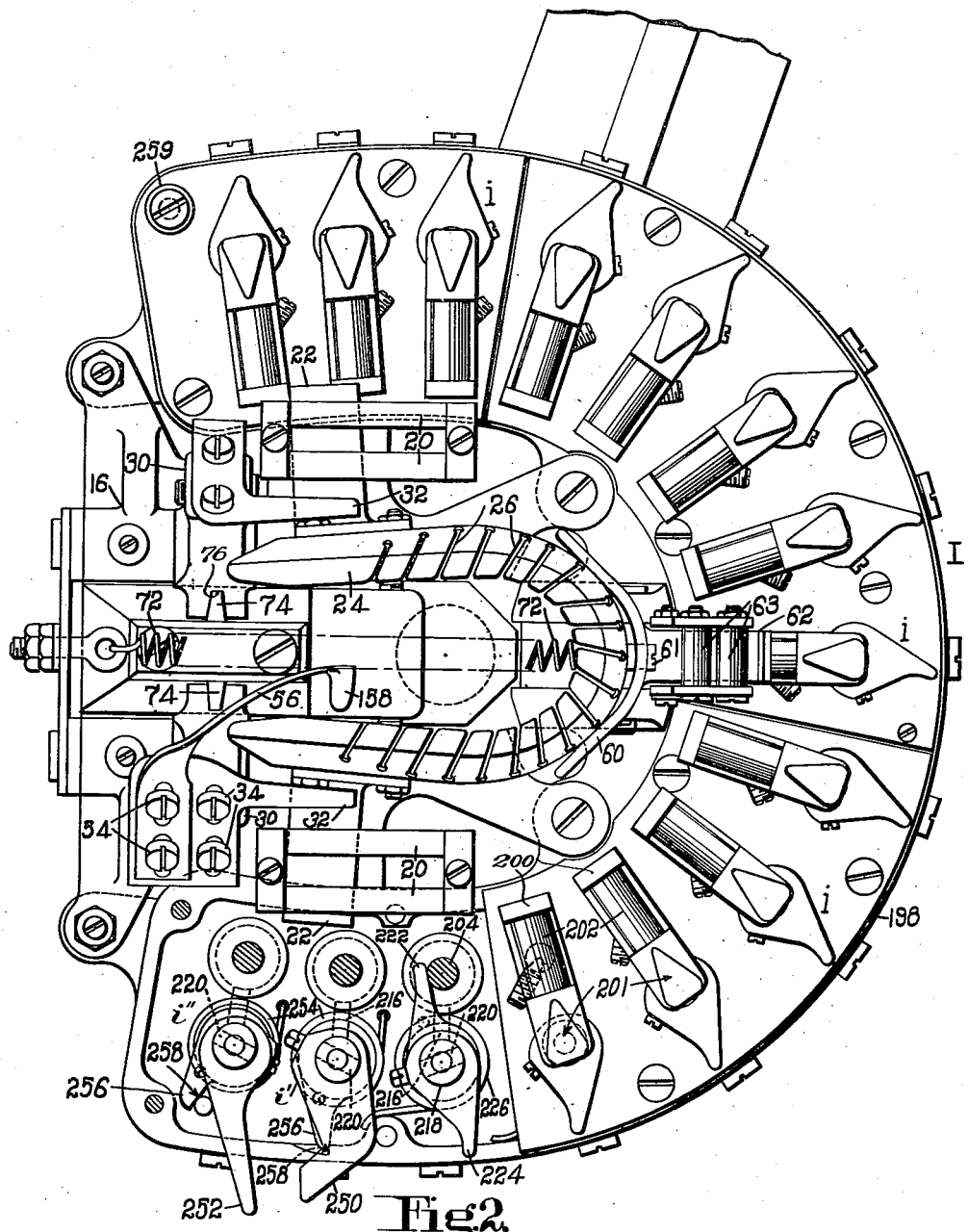
Figures 5, 6:
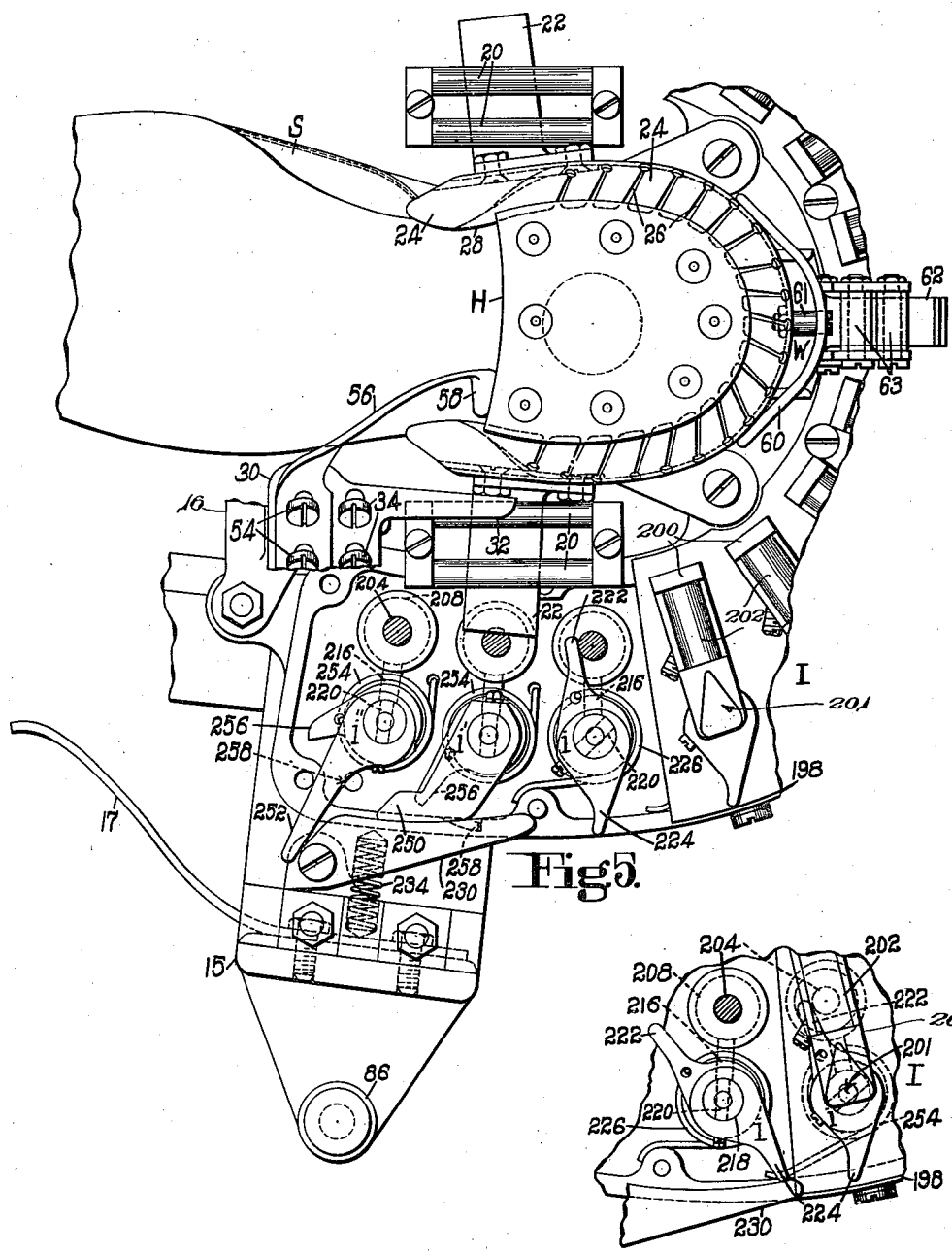
Figure 10:
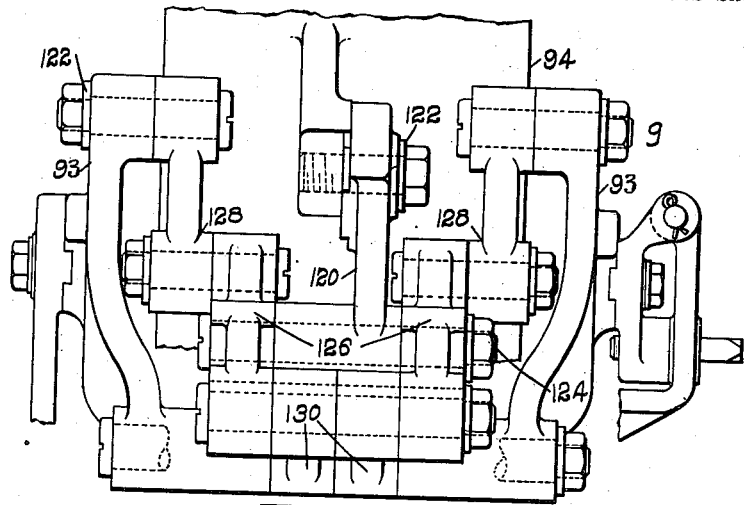
Figure 11:
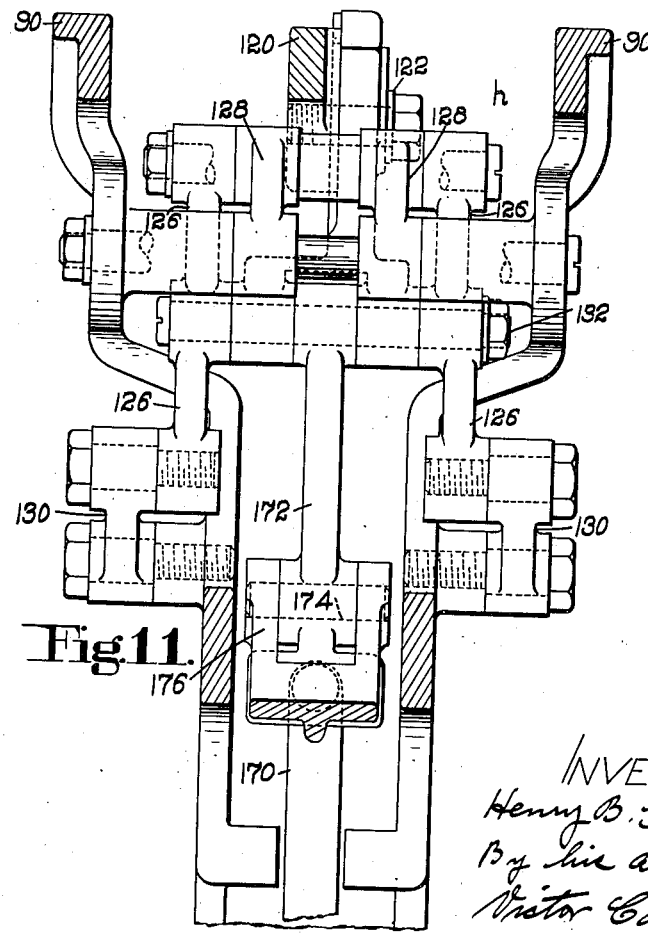
Figure 15:
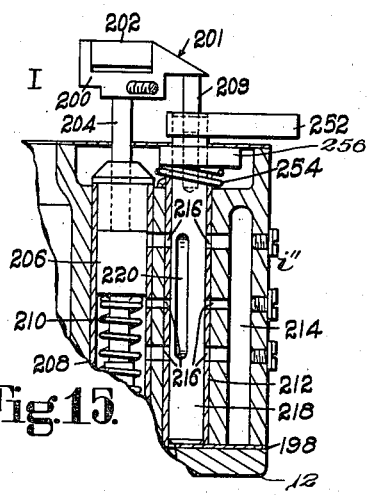
Figure 16:
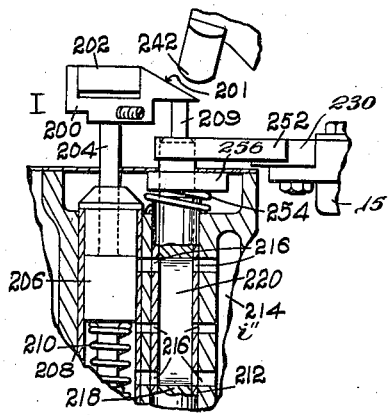
Figure 13:
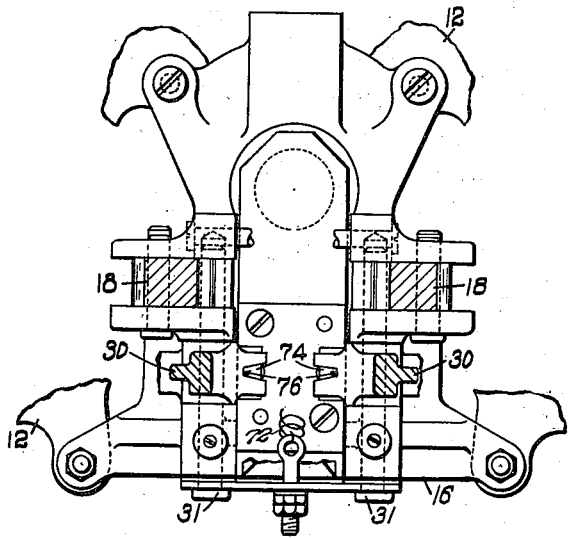
Figure 17:
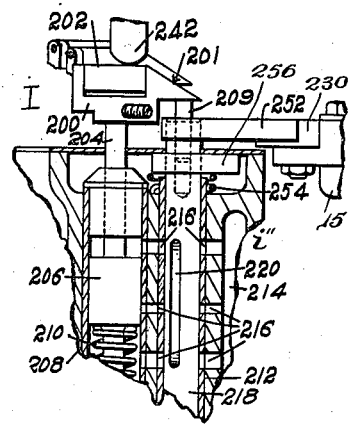
Figure 14:
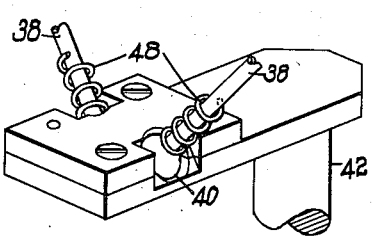
Figure 18:
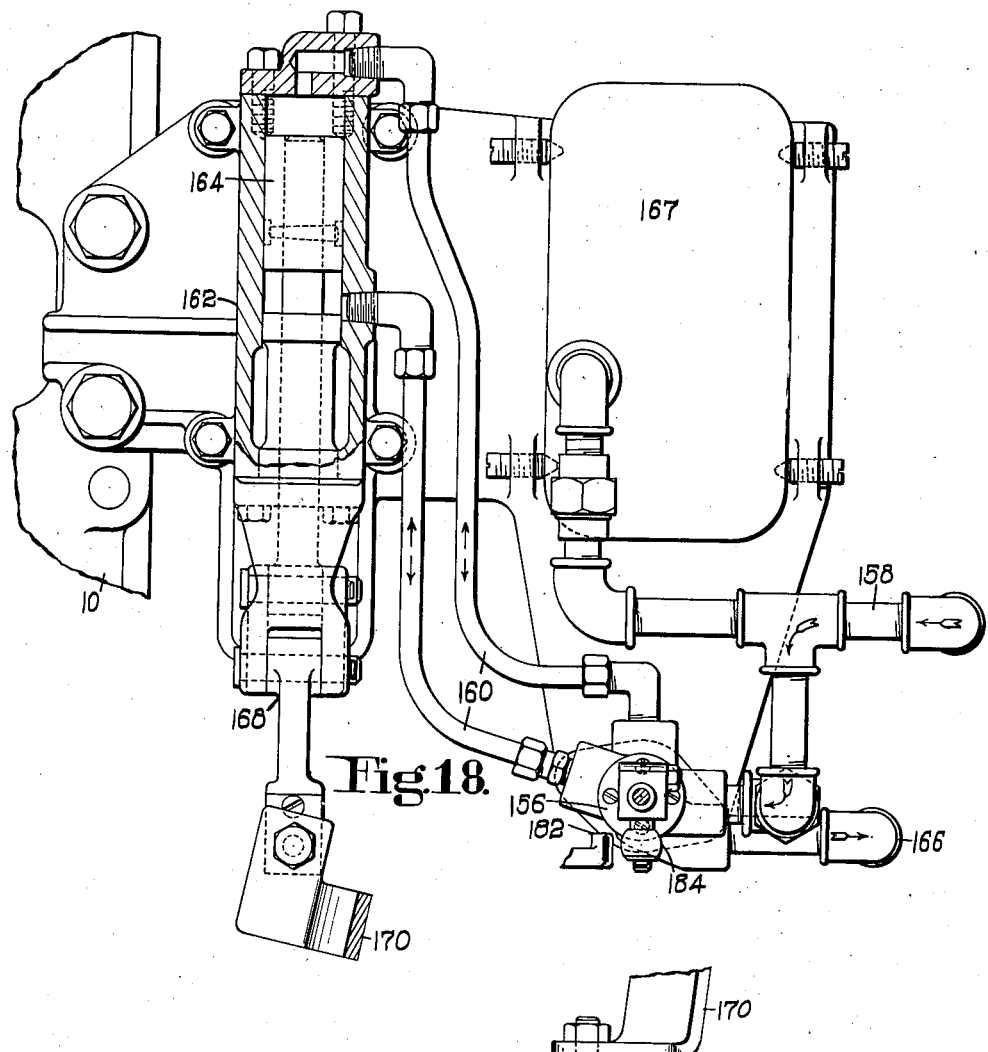
Figure 19:
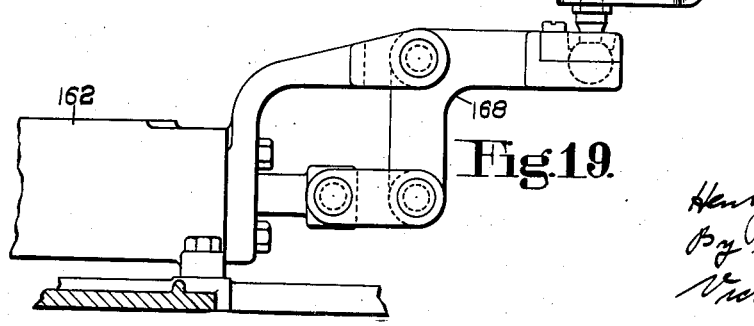
Figure 20:
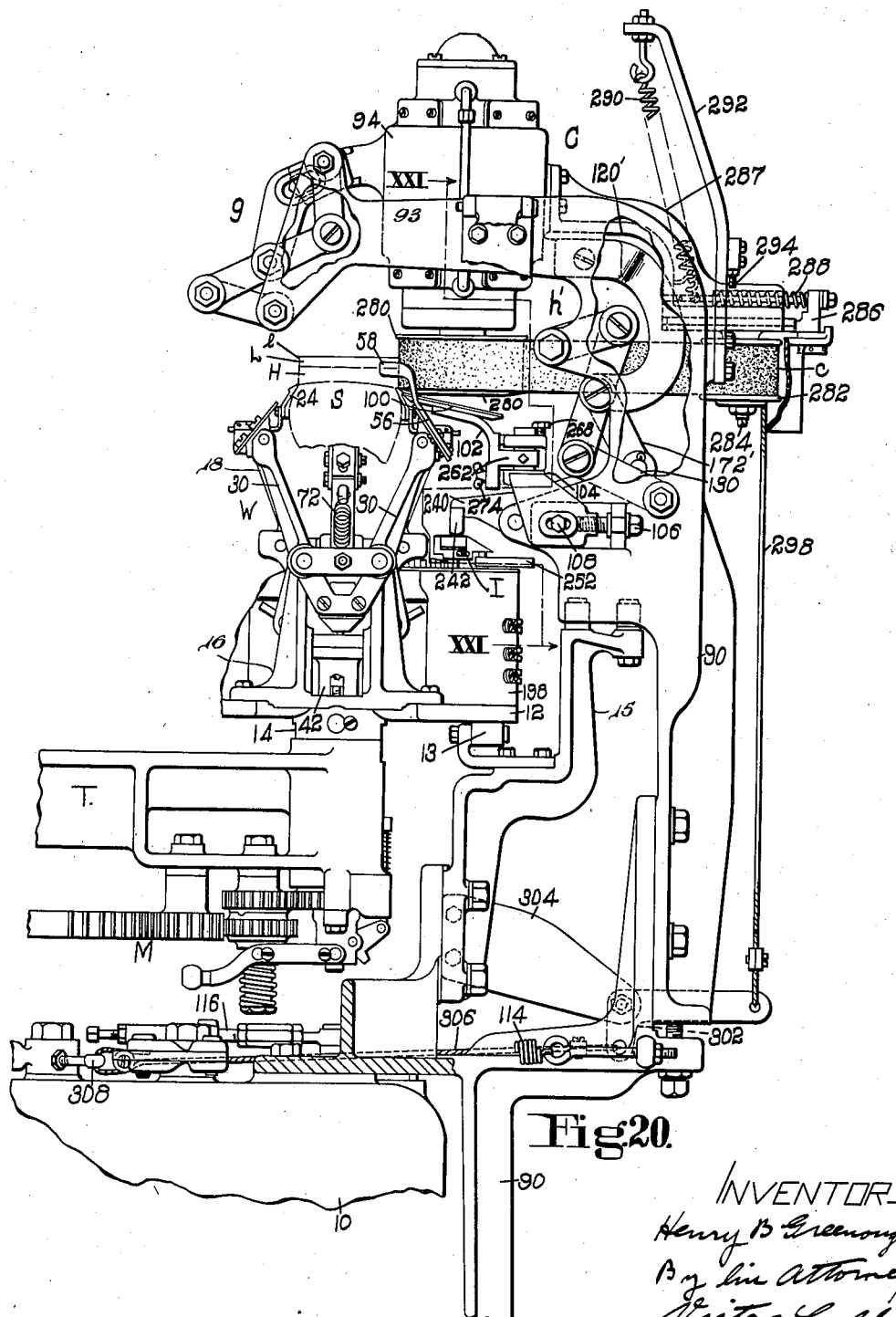
Figure 21:
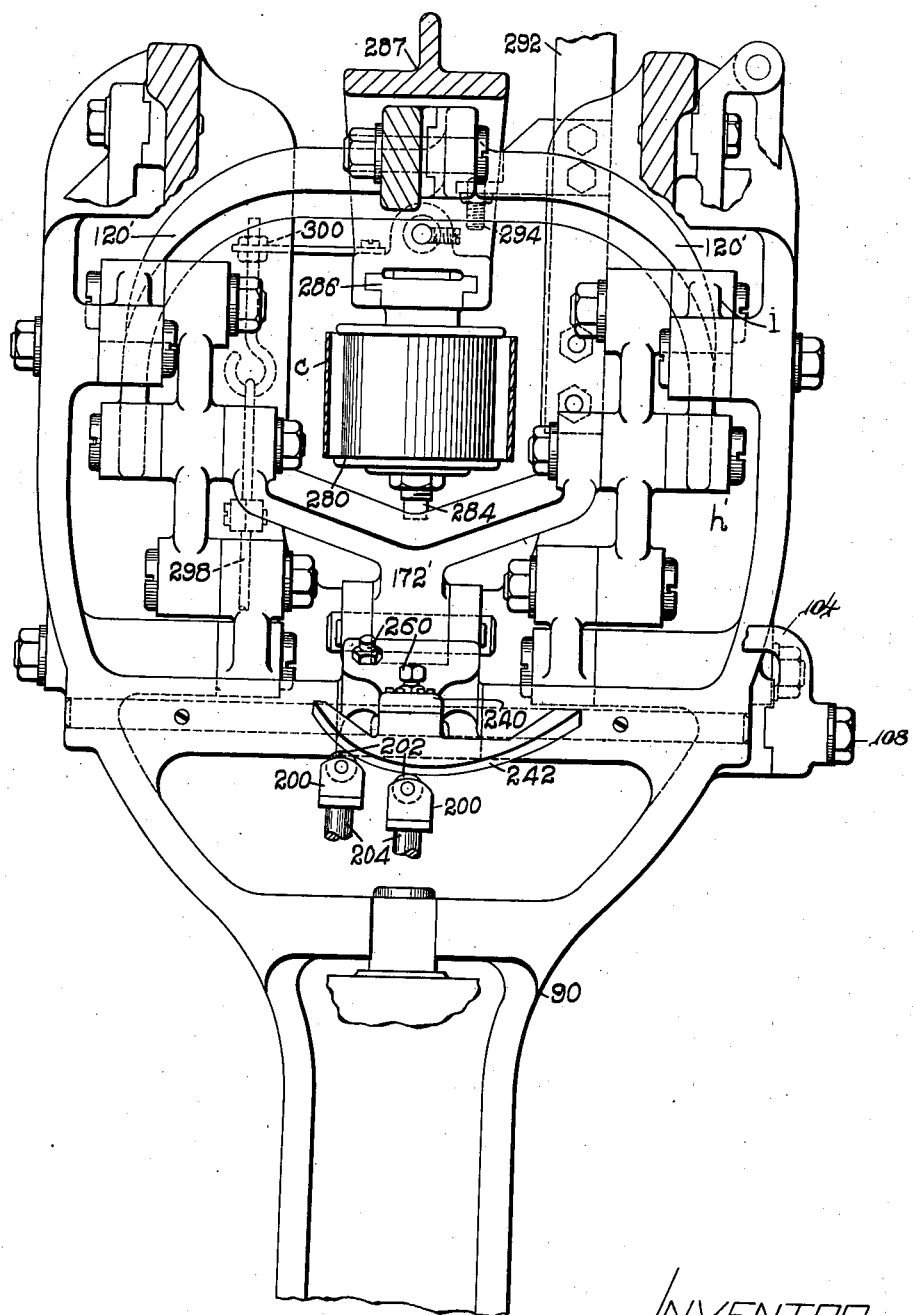

In the accompanying drawings, illustrating one of the many embodiments which my invention may assume, Fig. 1 is a front elevation of the improved machine;

Fig. 2 an enlarged plan view of one of the work-supports, with its tool-controlling cam;

Fig. 3 a side elevation of the heel-trimming and randing mechanism and a portion of the associated turret;

Fig. 4 a side elevation of elements included in the connections between the feeler of the trimming and randing mechanism and the valve which it controls;

Fig. 5 a partial view, similar to Fig. 2, and including means for controlling the locking of the cam-sections;

Fig. 6 a like fragmentary view bringing out the action of the controlling finger upon one of the cam-sections;

Fig. 7 a vertical transverse section through one of the work-supports, together with its actuating means and an associated cam-section, a shoe being clamped in the support;

Fig. 8 a transverse sectional detail of the actuating means of Fig. 7, but in the work-releasing relation;

Fig. 9 an end elevation of the cam-engaging means, included in one of the operating mechanisms;

Fig. 10 an enlarged end elevation of the outer motor- and tool-supporting linkage of Fig. 3;

Fig. 11 an enlarged vertical section, taken just back of the motor, and showing the rear supporting linkage;

Fig. 12 an enlarged side elevation of the rear portion of a work-support and the more closely associated elements;

Fig. 13 an irregular horizontal section through the band-carrying and -actuating means of the work-support of Fig. 7;

Fig. 14 a detail in perspective of a portion of the toggle-connections for actuating the work-support;

Fig. 15 a vertical transverse sectional detail through one of the cam-sections and its controlling means, in an initial position before resetting;

Fig. 16 a similar view with the cam-section unlocked, ready for setting;

Fig. 17 a like view with the cam-section set and locked;

Fig. 18 a plan view, partly in section, of the hydraulic mechanism by which the angle of the trimming and randing mechanism is altered;

Fig. 19 a detail in side elevation of the connection between the hydraulic mechanism and the mechanism which it actuates;

Fig. 20 a view, similar to Fig. 3, of the coarse-scouring mechanism;

Fig. 21 an enlarged irregular vertical section taken at the rear of the motor in Fig. 20;

Fig. 22 a vertical sectional detail, particularly illustrating the mounting of the contact-lever and gage-disk of the coarse-scouring mechanism;

Fig. 23 a fragmentary plan of the support for the gage-disk appearing in Fig. 22; while Fig. 24 illustrates, in side elevation, the engagement between the gage-disk of Fig. 20 and the work-support.

Upon a frame 10 is rotatable about a vertical axis a turret T. Rising from the upper face of the turret, near the periphery and spaced equally from one another about it, are work-supports W, of which there may be five. Each support has a carrier-plate 12, the hub 14 of which is stepped for rotation upon the turret. All the supports may be carried in the rotation of the turret successively to stations equal in number to the supports. The character of the operations performed at these stations is not necessarily material to the present invention. They are herein disclosed as acting to shape, to the desired contour, the periphery of a heel attached to a shoe. For this purpose, there is an entering station A, a trimming and randing station B, a coarse-scouring station C, a fine-scouring station D, and a brushing station E. During a complete operating cycle made up of five successive steps, the turret rotates through 360° to present, successively, each work-support to each operating station, and each of said supports is rotated about the axis of its hub 14 to cause the tools of the operating stations to act upon certain of the desired portions of the heels or other work. A reverse rotation of the turret also plays a part in this action of the tools. During rotation of the support, its plate 12 may rest upon a roll 13 turning about a horizontal axis upon a bracket 15 fixed to the frame 10. This resists displacement of this side of the plate by pressures applied from above, as will later appear. The support is steadied in its rotation by a spring-finger 17 projecting from the bracket and bearing upon the edge of the plate. Rotation of the support is thereby guarded against, while it is not under the control of its actuating means.

The tools are moved from inactive positions, after the supports are located ready for the operations, to active positions, and are returned immediately upon the completion of said operations. Further, the work is clamped in each support at the entering station, and then freed for removal as it is arriving at said station at the completion of the operating cycle. These movements imparted to the elements may be the same as those set forth in Letters Patent of the United States No. 1,943,308, Greenough, January 16, 1934, and produced by the same means. This main actuating mechanism, located within and just above the body-portion of the frame 10, below the turret, is indicated by the character M. It will be sufficient, here, merely to outline the operations for a complete cycle. The operator applies a shoe to a support W which is approaching or is at the station A, with the heel-end pointing in an anti-clockwise direction as viewed from above, and depresses and releases a treadle t (Fig. 1). This causes the successive engagement of two clutches in the mechanism M, and, under the power of the machine, the work is clamped. There are also produced movements of the turret and work-supports constituting the first step of an operating cycle and a shifting of constantly driven tools into and out of active position. The work-support, after leaving the entering station, is advanced anti-clockwise to station B by rotation of the turret, being released from the means which causes rotation about its own axis, and stops with a rotatable combined trimming and randing cutter b at the station opposite the outer breast-corner of the heel. The cutter is moved into its operating position and the actuating mechanism then reverses the rotation of the turret, it turning back clockwise to carry the side wall of the heel along the cutter b to a point at the outer wall between the gradually curved side and the more sharply curved rear. During this reverse movement, the cutter trims this portion of the heel to approximately the chosen form and bevels the edge of the outsole adjacent to the rand-crease. The turret again stops, and the work-support is rotated about its axis clockwise while the cutter acts upon the curved rear portion of the heel and outsole. This motion ceases when the opposite, less curved side is reached, and the turret again turns clockwise for operation upon this portion of the work. The first step of the cycle is thereby terminated, with the inner breast-corner of the heel at the cutter and the cutter shifted out of operating position, power being disconnected automatically from the actuating mechanism M. The operator, after applying a shoe to the succeeding support W now at station A, depresses and releases the treadle t. Again the turret takes a step anti-clockwise, and while the support, the movement of which was first considered, is advancing from station B to station C, it is rotated anti-clockwise about its vertical axis through substantially 180° to bring the heel-end of the shoe again in the direction of revolution. This sequence of operations occurs in connection with the succeeding stations, a course abrasive belt c at station C preliminarily smoothing the trimmed wall of the heel, then a finer belt d acting upon the heel-wall at station D, and a brush e at station E removing from the scoured surface the dust which has been created. The support finally again reaches station A in its initial position with respect to the ends of the shoe, the heel-breast being opposite to the direction of revolution. The work-support has been unlatched and its elements returned to their normal positions. Finally, the actuating mechanism M is disconnected from the driving means. The cycle is thus completed, and the shoe, with its trimmed and scoured heel, may be removed from the support and replaced by another for the succeeding series of operations.

Turning now to the features peculiar to the present machine, and taking first the work-supports W, all these may be the same so but one need be described. Attached to the plate 12 across a space at its outer edge, is a standard 16 (Figs. 1, 2, 3, 7, 8 and 13) upon which are secured two arms 18, 18 diverging upwardly and outwardly. Upon the upper extremity of each of these arms, pairs of horizontally spaced rolls 20, 20 are rotatable and between these rolls horizontal portions of brackets 22 are movable. The rolls are of considerable length, as shown in Fig. 2, so the bracket may shift between them longitudinally of their axes. Secured to vertical portions of the brackets are the opposite extremities of an upwardly and inwardly extending band 24 of sheet-metal, the flexibility of which may be increased by slots 26 cut in its upper portion. The band is of generally horseshoe-shape and has a reduced upper edge 28, which is adapted to enter the rand-crease of a shoe S, and conform itself about the counter-portion to the entire range of sizes of shoes to be operated upon. The band is forced inwardly by a pair of levers 30, 30 fulcrumed at 31, 31 upon the standard 16, and each provided at its upper extremity with an angular extension 32 arranged to act upon the vertical portion of the corresponding bracket 22. Slot-and-screw connections 34 permit the extension to be adjusted vertically upon its lever. Lower arms 36 of the levers 30 furnish links of toggle-levers, the other link of each of which is in the form of a rod 38, joined by a universal joint 40 to the head of a spindle 42 guided for reciprocation through the plate-hub 14. Each rod 38 has a swiveled connection to the lever arm at 44, it being movable through a bore in the swivel. An expansion-spring 48 surrounds the rod, abutting at its ends against the joint 40 and the swivel 44. The spindle 42 is elevated by the mechanism M, the spindle-head resting initially against a stop 46. As indicated in Fig. 8, when the spindle is lowered the toggle-connections carry the upper arms of the levers 30 outwardly, so their extensions 32 leave the band 24 free to assume an open position due to its resilience. As already pointed out, depression and release of the treadle causes clamping of the work under the power of the machine. The spindle 42 is elevated by a reciprocatory member 50 (Fig. 1), as in the previously indicated patent, and latched in clamping relation by a pawl 52 (Fig. 3), which is automatically released as the support approaches the entering station A at the termination of a full operating cycle. When the heel-end of a shoe has been introduced into the band 24, the projection 28 of which enters the rand-crease, and the spindle is raised by the mechanism M, the rods 38 are swung outwardly and through the springs 48 force out yieldably the arms 36 of the levers 30. This carries in the upper arms of these levers, and their extensions 32 press toward each other the sides of the band to hold the shoe firmly between them.

To fix the shoe in a definite position longitudinally, one of the levers 30 has adjustably secured to its upper extremity by slot-and-screw connections 54 a gage-finger 56, having projecting from its free end an extension 58 which normally lies opposite the opening between the ends of the band 24. Thus located, this extension is in front of the breast of a heel H upon the shoe in the band, furnishing a retaining abutment. Upon the introduction of the shoe into the band, it contacts with the inner side of the finger 56, swinging it to one side of the path of advance into the band and compressing the spring 48. After the heel-breast has passed the extension 58, the spring returns the finger and its extension to gaging position. When the shoe reaches the rear of the band, it forces back a curved pressure member 60 (Figs. 2, 5 and 12) arranged to contact with the rear of said band at its opposite sides. The member is shown as extending oppositely from the vertical portion of a bracket 62, a horizontal portion of which is guided to slide between pairs of horizontal rolls 63, 63 rotatable upon the upper extremity of an arm 64 extending upwardly and outwardly from the standard 16. At the juncture of the member 60 and the bracket is an opening, in which is guided a projection 61 from the rear of the band 24. As illustrated, the member 60 is mounted for vertical adjustment, the arm being provided with a separate end-piece 66 carrying the rolls and bracket and joined to the body of the arm by slot-and-screw connection 68. Against the outer extremity of the bracket 62 bears a spring-arm 70, secured to the lower portion of the arm 64. Exerting constant tension upon the arm 70 is a spring 72, connecting said arm to the standard 16. Upon the introduction of a shoe into the band 24, the force which it exerts horizontally will carry back the member 60, the arm 70 and the spring 72 yielding. At this time, the brackets 22 at the ends of the band may shift longitudinally of their supporting rolls 20. As the operator frees the shoe, the action of the springs upon the contact-member 60 will urge this against the band, carrying said band and the heel back to a position determined by the gage-extension 58. Consequently, when the operator depresses the treadle $t$ and the arms of the levers 30 swing in, the work will have been correctly located.

As the work is engaged by the final movement of the sides of the band 24 toward each other, it is desired that said band be locked, so the shoe shall remain clamped throughout the full operating cycle after the support W has left the actuating member 50 at station A. Mounted upon the standard 16 below the fulcra 31 of the levers 30, are opposite locking plates 74, 74 guided to slide toward and from each other in upwardly inclined directions (Figs. 7 and 8). As best shown in Fig. 13, the plates have V-shaped edges lying in complemental depressions 76 in the levers 30 near their fulcra. Guided for vertical movement between the plates is a wedged-shaped actuating plate 78 resting upon an expansion-spring 80, seated upon a plunger 82 movable upon the standard and with its lower end lying in the path of the head of the spindle 42. Initially, these locking elements are in the relation appearing in Fig. 8, with the wedge-plate so held that the plates 74 apply no retaining force to the levers 30, but when the spindle rises in the clamping of the work, its head strikes the plunger 82 and through the spring 80 and wedge 78 forces out both plates 74. These, by their engagement with the lever-depressions 76, frictionally lock the levers 30 and therefore brackets 22 and the sides of the band in work-clamping relation. When the support W returns at the termination of an operating cycle to station A for the removal of the work, the release of the latch 52 permits the lowering of the spindle 42. The plunger 82, the spring 80 and the wedge 78 are thereby relieved of pressure, and the levers 30, with the breast-gage 56, are freed to release the work.

After the shoe S has been clamped in the support W at station A, rotation of the turret T transfers it to station B for the trimming and randing operation. Referring to Figs. 1 and 3 of the drawings, the trimming and randing mechanism has an upwardly extending arm 90 pivoted at 92 upon the frame 10 and so offset that its upper portion extends at 93 about and over the turret and work-supports. The arm is formed in sections and is adjustable with respect to its length by slot-and-screw connections 84 and a push-screw 86. It is guided in its pivotal movement toward and from the turret by a roll 88 rotatable upon the bracket 15 and extending between spaced walls of said arm. Upon the arm above the path of the supports is mounted a motor 94, preferably electric, having fixed to the lower end of its shaft the cutter $b$. This has, as appears in Fig. 12, blades 96 to act upon the periphery of the heel H and blades 98 for forming a beveled rand. The bodily approach of the cutter to the work is controlled by a disk 100, rotatable in an inwardly and upwardly inclined position upon a bracket 102 adjustably secured at 103 to the top of an angular bracket 104. The lower horizontal arm of the bracket 104 may be adjusted toward and from the turret by a push screw 106 and slot-and-screw connections 108. The disk has a beveled edge 110 arranged for engagement with an inclined shoulder 112, surrounding the band 24 just below its crease-entering edge (Fig. 12). A spring 114, joining the arm 90 to the frame 10, acts, when permitted, to draw the disk-surface 110 against the band-surface 112. Thus, as the support W is either revolved or rotated, the cutter $b$ will be held in to the periphery of the heel, and its relation will be undisturbed by irregularities which might be present were this locating of the tool to be effected by contact with the surface of the work itself. The arm 90 is held out against the tension of the spring 114 by connections 116 to the main actuating mechanism M, during the transfer of the work-supports by anti-clockwise rotation of the turret T from station to station, and then is freed in preparation for the action of the cutter during the clockwise rotation of the turret and the rotation of the work-support. The connections 116, and the manner of their operation, may be in all essential particulars the same as in the patent before referred to.

The inclination of the trimmed wall of the heel to the vertical axis of said heel is determined by tilting the operating portion of the cutter $b$ about points $x$ in the meeting line bounding the wall between the rand and the periphery of the heel. To this end, the casing of the motor 94 is carried upon the portion 93 of the arm 90 between spaced linkages $g$ and $h$. As may be seen in Figs. 3 and 10, at the linkage $g$ a projection 120 from the motor-casing, adjustable at 122 as to length, is pivoted at 124 to two links 126, 126, which are hung at one extremity to the arm-portion 93 by links 128 and at the other by links 130. The linkage $h$ (Fig. 11) is similarly arranged, corresponding elements being identified by the same reference-characters. Both are so proportioned that the axis of the pivot 124 of linkage $g$ and a corresponding point 132 of linkage $h$ move along arcs about the points $x$ in the work, this being determined by the linkages independently of engagement with the work.

The degree of inclination of the periphery of the heel H from the rand at $x$ toward the tread-end is gaged from the periphery of a toplift L upon the heel, it being attached to the base with sufficient accuracy to render this possible. The width of the trimming edge 96 of the cutter is such that a narrow portion $l$ (Fig. 12) is left uncut upon the toplift along a line limited to close proximity to the tread-surface. From this line the gaging is done, the projection being taken off in the coarse-scouring operation at station C. Contacting with the surface at $l$ is a feeler 140, carried for vertical adjustment at 142 upon the generally horizontal arm of a bell-crank-lever 144 fulcrumed at 146 upon the motor-casing, a vertical arm of the bell-crank being articulated to a link 148 adjustable as to length. A tension-spring 149, joining the vertical arm of the bell-crank to the motor-casing, urges the feeler outwardly into engagement with the portion l of the toplift. The outer extremity of the link 148 is joined to a crank-arm 150 (Fig. 4) upon a vertical rod 152 rotatable in an extension 153 from the motor-casing. A connection at 154 permits some relative angular and longitudinal movement between upper and lower sections of the rod, while compelling rotation. At its lower end, the rod 152 is attached to the rotatable body-portion of a valve 156 controlling hydraulic pressure supplied by an unillustrated pump through piping 158 (Fig. 18) and selectively through piping 160 to the opposite ends of a cylinder 162 supported upon the frame 10 and in which a piston 164 reciprocates. Exhaust from the cylinder occurs through the piping 160 and a pipe 166, and a cushioning or storage chamber 167 is shown as connected to the supply-piping. According to the end of the cylinder to which the valve 156 admits liquid, the piston moves in one direction or the other, and in so doing oscillates a bell-crank-lever 168 fulcrumed upon a bracket secured to the cylinder (Fig. 19). A link 170, which may be adjustable as to length, unites a horizontally extending arm of the bell-crank-lever to a link (Figs. 3 and 7), which is pivoted to the pivotal point 132 of the linkage h and at 174 to a lever 176 fulcrumed at 178 upon the arm 90. The valve 156, and the manner in which it governs movement of the piston 164, may be the same as the rotatable reversing valve of Letters Patent of the United States No. 1,078,684, Keall et al., November 18, 1913, it having a rotatable plug or body in which are passages controlling the flow of liquid through ports in the valve-casing. It is desired to so incline the axis of the motor-shaft, and therefore of the cutter b, that the edges of the blades 96 will assume angles about points x, which correspond to the angles having their apices at x, and occurring between lines parallel to the axis of the heel and lines joining x to the periphery of the toplift. When these angles are the same, the connections to the feeler maintain the valve 156 closed and the piston 164 remains at rest. At this time, connections through the bell-crank 168 and the links 170 and 172 to the linkage h hold the motor and cutter against movement, while the work is receiving the trimming action. If, however, the contour of the toplift, acting upon the feeler, causes said feeler to swing outwardly, the connections 144, 148 and 152 from the feeler so open the valve that pressure is admitted to the cylinder 162 upon the side of the piston which forces up the link 170. The motor is thereby tilted clockwise (Fig. 3), and the cutter removes from the heel and toplift any excess of material. This continues until the angle of the cutter agrees with the line at x, l, whereupon the valve is closed and the motor and cutter are again held against angular movement. Had the contour of the surface l resulted in opposite or inward movement of the feeler, the travel of the piston would have been reversed and the motor and cutter tilted anti-clockwise to decrease the amount of material removed.

When the arm 90 is restored to its outward, inactive position after the completion of a trimming operation, provision is also made for tilting the motor and cutter outwardly from the work upon the linkages g and h. There is fulcrumed upon the arm a bell-crank-lever 180, having an upper contact-portion 182 (Fig. 18) arranged to engage a projection 184 from the rotatable portion of the valve 156. The lower arm of the bell-crank is united to the frame 10 by a link 186, the length of which may be varied. When the arm 90 is swung back to remove the operating mechanism from the work, the connection at 186 rotates the bell-crank in a clockwise direction (Fig. 3). This so turns the valve as to apply pressure to the piston 164 to move the motor in the desired direction. The purpose of this oscillation of motor and tool, independently of that under the control of the feeler 140, will appear later.

The variation in the angular position of the axis of the cutter b at station B is utilized to effect like movements of the operating means at the succeeding stations. For this purpose, there is carried upon the plate 12 of each support W a cam I; see Figs. 2, 5, 6, 7, 15, 16 and 17. This cam, adjusted as to form at station B, controls the operating mechanisms at stations C, D and E. It has a casing 198, approximating in horizontal contour that of a heel, and upon which are movable a series of successive cam-sections arranged in an arc about the support. These may be identical as to form. Considering any one of the sections, it consists of a head 200 having at its outer side an upwardly and inwardly inclined surface 201, leading to a contact-roll 202 rotatable about a horizontal axis radiating from substantially the center of the band 24. The head is carried upon a vertical rod 204 rising from a piston 206, reciprocable in a cylinder 208 at the inner side of the casing 198. Rotation of the head and piston about their vertical axis is prevented by a pin 209 depending from the former through an opening in the cover-plate of the casing. The piston is urged normally upward by a spring 210 interposed between it and the bottom of the cylinder, and to an extent allowed by the engagement of the piston with the upper cylinder-head. To lock the piston, and therefore the head 200 in an adjusted position and then release them at predetermined times, there is mounted in the casing 198 adjacent to the cylinder 208 one of a series of valves i, i', i'', each having a casing 212. This valve-casing is joined to the cylinder 208, and to a liquid-containing chamber 214 formed in the casing 198, by three pairs of opposite ports 216. Rotatable in the casing 212 is a valve-body 218, through which is an elongated transverse passage 220. Save as to the valves i' and i'' of the first two units of the sectional cam I, at the side of the support W where the valves are initially operated at each station, the manner of actuation is the same. Considering any one of the valves i, its body 218 extends above its casing 212 and the main casing 198 and has fast upon it oppositely projecting arms 222 and 224. The first of these arms is normally forced by a torsion-spring 226, connecting the valve-body to the casing 198, against the adjacent piston-rod 204. As appears in Fig. 2, this places the passage 220 out of registration with the ports 216. The liquid in the cylinder 208 above and below the piston 206 is consequently confined in closed chambers, and, because of its non-compressibility, the piston and cam-head 200 are held positively against vertical movement. The arm 224 is arranged to be carried, in the movement of the support W, into contact with an actuating finger 230 (Figs. 3, 5 and 6) pivoted upon the upper extremity of the bracket 15 and yieldable outwardly against a spring 234. In the anti-clockwise revolution of the arm 224 by the turret T, as the support W travels from station A to station B, said arm will so engage the finger 230 that the other valve-arm 222 will be forced against its stop. At this time, the finger yields against the spring 234, but when the support moves in a clockwise direction, either as revolved by the turret or rotated about its own axis to subject the peripheral wall of the heel to the action of the cutter b, the arm 224 strikes the end of the finger and rides along its inner curved edge. As appears in Fig. 6, the body 218 of the valve i is thereby rotated to carry the passage 220 into registration with the ports 216. This unlocks the piston 206, the liquid now flowing freely from one side to the other, so it may be urged up by its spring 210 to cause the head 220 to be freed for readjustment vertically to correspond to the angular relation of the axis of the cutter in a manner to be hereinafter described. The piston and head are then again locked by release of the arm 224 and closure of the valve by the spring 226.

After the actuating arms 224 of certain of the valves i pass the finger 230 in the anti-clockwise revolution of the support W by the rotation of the turret and cause said finger to yield, the finger is successively engaged by arms 250 and 252, respectively projecting from the bodies 218 of the valves i' and i''. These valves have torsion-springs 254 which act oppositely to the springs 226, they normally holding stop-arms 256 against surfaces 258 upon the cam-casing 198. As will be seen in Fig. 2, the passages 220 in the valves i' and i'' lie normally at a different angle with respect to the ports 216 than the passages of the companion valves i. When the actuating arm 250 reaches the finger 230 in the rotation of the turret, its curved outer edge engages and rides over the complementally curved edge of the finger, opening the valve i' to release its cam-section. This engagement continues as the arm 252 reaches and contacts with the rear edge of the finger, the valve i'' being thereby also opened to free the first cam-section. Upon the clockwise movement of the support W, during reverse rotation of the turret, the arms 252 and 250 are successively released from the finger at the proper times to prepare for the relocking of the sections after they have been set.

The lever 176, which is moved by the piston 164 controlled by the feeler 140, has means to determine the vertical position of the head 200 of each section of the cam I. Arranged to rock upon the arm 90 about the fulcrum 178 of the lever 176 is a lever 240, having fixed to its outer extremity a laterally extended, convex contact-portion 242 (Figs. 7 and 9), which is held normally down by an expansion spring 244 situated between the levers. This spring is without effect unless the contact member encounters some abnormal resistance, as when a cam-section has been accidentally locked, then the spring yields and prevents breakage. The vertical position of the lowermost surface of the arcuate contact-portion 242, as it is oscillated with the lever 176 and the linkages g and h supporting the motor during the operating period, corresponds to the angular relation of the cutter. After the anti-clockwise rotation of the turret T has carried the cam-sections until the first, or that having the valve i'', is opposite the cutter b, the arm 90 is swung in from its outer inactive position toward the work-support. Its contact-portion 242 finds the valve i'' open, with the piston 206 unlocked and the head 200 elevated by the spring 210. The motor with the cutter is held tilted outwardly upon the arm, because of the action of the lever 180 upon the valve 156, with the cutter separated to the maximum extent from the work, until the arm 90 has reached its inward position, and the contact-portion 242 is adjacent to the upper margin of the inclined surface 201 of the head. The lever 180 has now left the valve-projection 184, so the angular relation of the motor and cutter is under the control of the feeler. This, contacting with the periphery of the toplift L, causes the hydraulic mechanism to continue the forward movement of the cutter, and the contact-portion 242 rides up the remainder of the inclination of the head, forcing it down and arriving over the roll 202. This cam-section is thereby lowered to a point determined by the angle which the motor assumes under the control of the feeler, the downward thrust upon the casing of the support W being resisted by the roll 13 on the frame. Because of the delayed movement of the motor and cutter upon the arm to operating position, the depressing engagement of the contact-portion with the surface 201 may be made quite limited and cause little wear. Then, too, the contact of the feeler with the work may be made more gradual, and abrupt movements of the motor and cutter under the control of the feeler avoided. When the operating clockwise revolution of the work-support by the turret causes the valve-arm 252 to retreat from the finger 230, the spring 254 closes the valve i'' and locks the head 200 in its adjusted relation just before the roll 202 leaves the lowest point of the contact-portion 242. The first cam-section is thereby maintained in its cutter-determined position until unlocked during the succeeding operating cycle. As the movement of the work-support, due to its advance by the rotation of the turret, continues, the unlocked cam-section having the valve i' is forced down by its roll 202 passing beneath the curved edge of the contact-portion 242. It is locked when the arm 250 passes from the forward extremity of the finger 230 as the roll leaves the lowermost point of said contact-portion. Following this, and as already explained, each of the cam-sections with the valves i is unlocked just before its roll engages the contact-portion and is locked immediately before said roll leaves it. This is true for all the last-mentioned sections save that at the end of the series at which the action of the cutter terminates. Here, the clockwise revolution of the work-support by the turret stops with the valve-arm 224 still opposite the edge of the finger 230. The movement of the support is, however, sufficient to cause the finger to be engaged by a roll 259 (Fig. 2) rotatable upon the cover of the casing 198. This presses back the finger to free the arm 224, so the spring 226 turns the valve i to locking position. The last cam-section is therefore held at the height to which it has been set by the contact-portion 242. The result of all this is to produce about the support a cam-surface, the contour of which corresponds to the successive cutter-angles and which, as previously indicated, may be used to control the angles of the operating means at other stations without employing the feeler and hydraulic mechanism. The complication of the machine is thereby reduced and, because of the absence of the feeler, the top-lift-projection at *l* may be scoured away without disturbing the control of the operating mechanisms at stations C, D and E.

After the complete operating movement of the support W upon and by the turret T at station B, the next step in the anti-clockwise rotation of the turret revolves the support to station C. Initially, the supported shoe will travel toe first, but during its movement it will be reversed, so it arrives at station C in the same relation as it approached station B. At station C, the means for supporting and operating the coarse-scouring member *c*, save for minor differences in form, are the same as those elements at station B, they being shown in Figs. 20 to 24, inclusive. The arm 90 carries the motor-casing 94 upon a linkage *g* which may be identical with that at station B. The rear linkage *h'* differs in no substantial particular from the linkage *h*, except that its link 172' is in the form of a Y, so it may clear the scouring belt, and the motor-projection 120' is bifurcated for this reason. The contact-lever 240 is not yieldable about its fulcrum, but is adjustably fixed as to angle upon its lever 176 by screws 260. The bracket 102 of the gage-disk 100 is adjustable upon the arm-bracket 104. It is secured through an extension 262 by a screw 263 to a spindle 264, which may turn in bushings 266 movable along a vertical bore in the bracket 104. Opposite screws 268, threaded into said bracket and having their heads engaging the outer extremities of the bushings, permit the bracket 102 and the gage-disk to be varied in their vertical positions. To allow the bracket 102 and the disk to be swung aside to clear the belt *c* and its mounting, so the former may be removed, said bracket may be turned horizontally about the axis of the spindle 264. The bracket and disk are held in normal operating relation by a rod 270, pivoted upon the bracket 104 and entering a vertical slot 272 opening through the lower extremity of the bracket 102. A nut 274, threaded upon the free end of the rod, clamps this in the slot and may be loosened and the rod dropped from the slot to release the disk.

The scouring belt *c* is driven by a pulley 280 secured to the spindle of the motor 94, it running at its rear extremity over an idle pulley 282 rotatable about a spindle 284. When the belt is in its active relation, a reduced edge 281 of the lower head of the pulley 280 may enter between the rand upon the heel H and the band 24 (Fig. 24). The spindle 284 depends from a slide 286, guided for substantially horizontal movement in a projection 287 from the motor-casing, and is urged rearwardly by a spring 288 to maintain the belt under tension. A tension-spring 290, joining the projection 287 to a bracket 292 rising from the arm 90, holds said projection against an adjustable stop-screw 294 upon the bracket for one extreme angular position of the motor 94 and belt *c*. At the same time, it permits the motor, with the belt, to shift angularly as the cam I, set at station B, moves in engagement with the contact member 242 of the linkage *h'*. As at station B, a spring 114 exerts its force to draw in the arm 90, so the periphery of the gage-disk 100 upon the arm contacts with the gaging-shoulder 112 upon the band 24 of the support W, during the action of the belt *c* upon the heel. The connection 116 to the mechanism M withdraws the arm and belt to their inactive relation when the operation has been completed. To tilt back the motor and belt from the supports W when the arm is thus withdrawn, a cable 298 is attached at 300 to the motor-projection 287 and at its lower extremity to the substantially horizontal arm of a bell-crank-lever 302, fulcrumed upon a projection 304 from the frame 10. A vertical arm of the bell-crank is joined by a cable 306 to an extension 308 from one of the movable members in the mechanism M which actuates the connection 116 for one of the arms 90. As the arm 90 at station C is carried back, tension is applied through the cables 306 and 298 to so tilt the motor that the belt *c* is separated from the work. The effect produced resembles that at station B, in that there is only limited engagement of the contact-portion 242 with the head-surface 201 and correspondingly less wear. At the beginning of the coarse-scouring operation, the contact-portion 242 of the lever 240, connected to the motor-supporting linkage *h'*, engages the first section of the cam I, which was set and locked at station B to correspond with the inclination of the cutter *b* as governed by the feeler 140. This positions the axis of the motor-shaft, and therefore the surface of the scouring belt *c* adjacent to the support W, at the same inclination to the vertical as was assumed by the cutter, the angles varying about the same points *x* in the line between the periphery of the heel and the rand. Downward displacement of the cam and its support during this action is prevented by the roll 13. As the successive cam-sections pass beneath the lever during the revolution and rotation of the support, the same effect is produced. Consequently, the entire periphery of the heel acted upon by the belt will have a uniform amount of material scoured from the trimmed surface across its entire width.

The fine-scouring belt *d* at station D (Fig. 1) is preferably supported and actuated in the same manner as the coarse belt *c*, and at station E the arrangement of the brush *e* may generally be the same as that of the cutter *b*. Neither requires special description. The work-support W moves to and on from these stations after leaving station C, finally reaching station A with the heel H of the desired peripheral contour and freed from the removed material.

In using the machine, the operator inserts the counter-portion of the shoe S, with its toe pointing to the left, between the sides of the band 24 of that work-support W which is at station A, the edge 28 of the band entering the rand-crease, and forces the work back against the spring-actuated contact member 60, until the breast of the heel H upon the shoe has passed the gage-portion 58 upon one of the clamping levers 30. The gage thereupon moves in front of the heel-breast. The operator then depresses the treadle *t* tripping a clutch of the actuating mechanism M. The member 50 rises under the power of the machine to force up the supporting spindle 42 and close in the levers 30. As the operator frees the shoe, the member 60 urges the band 24 forward until its movement is stopped by contact of the heel-breast with the gage 58. The lever-extensions 32 press against the opposite sides of the band to close these upon the shoe. Because of the resilience of the band, it conforms to the counter-portion and to the crease, and holds the work firmly for the operations upon the heel. The elevation of the spindle 42 also locks the levers 30 by the wedge 78, and said spindle is temporarily latched at 52 in its actuating position. This having been accomplished, release of the depressed treadle trips a second clutch of the actuating mechanism M to produce the second step of an operating cycle, the newly entered work being revolved by rotation of the turret T anti-clockwise to station B. Here, the tool-carrying arm 90 is in the outward, inactive position to which it was moved by the mechanism M at the close of the preceding operation. The motor 94 and the trimming and randing cutter b are also rocked outwardly upon the linkages g and h by the action of the bell-crank-lever 180 upon the valve 156 controlling pressure to the hydraulic cylinder 164, from which movement is communicated to the linkage h. The turret stops when the breast-corner at the outer side of the heel is opposite the cutter b; the mechanism M swings in the arm 90 to operating position; and the cutter is located in proximity to the periphery of the heel by contact of the gage-disk 100 upon the arm 90 with the smooth and regular surface 112 of the band 24. This movement of the arm toward the support W places the contact member 242, movable under the influence of the linkage h, above the upper portion of the inclined surface 201 of the first vertically adjustable section 200 of the cam I, this section being governed by the valve i″. The feeler 140 engages the periphery of the toplift L secured to the heel H. This feeler, governing the valve 156, controls the application of the force of the cylinder 164 in the hydraulic motor mechanism to the linkage h to tilt the motor and cutter about the center x, in the line at which the rand meets the side wall of the heel. Depending upon whether this wall lies outside or inside the desired angle to which the periphery of the heel is to be trimmed, the feeler-controlled mechanism will shift the motor and cutter in or out upon its linkages, so said cutter will remove more or less material from the heel to bring this to approximately the chosen form. The projection l, however, is left upon the toplift to receive engagement of the feeler. The movement of the contact member 242 under the influence of the arm 90 having carried said contact member over the upper portion of the incline 201, as just indicated, then the feeler-controlled movement of the contact member with the linkage h will advance it over the roll 202 of the first cam-section 200. This it depresses against the spring 210 to a position determined by the angular relation of the cutter. This first section was unlocked by its valve i″ when it reached the finger 230 in the anti-clockwise rotation of the turret. Now, the mechanism M reverses the direction of rotation of the turret, so the side of the heel is subjected to the action of the cutter. The valve of the first cam-section, in leaving the finger 230, locks the section-head in its adjusted relation. Following this, the valves i′ and i of the succeeding sections, by the repeated action of the finger, are caused successively to unlock and then lock the heads of their sections in positions corresponding to the operating angles of the cutter. This is first during the clockwise revolution of the support W by rotation of the turret T, then during clockwise rotation of the support about its axis upon the turret, and finally during further clockwise revolution of the support. When the last section reaches the opposite breast-corner of the heel, and the roll 259 has freed the corresponding valve i from the finger 230, so it may lock the section, the trimming operation will have been completed, and all the sections set to provide a cam with a contour determined by the successive angles assumed by the cutter. The turret stops; the arm 90 is swung back by the mechanism M; and the motor and cutter are tilted outwardly upon the arm by the action of the lever 182 upon the valve 156. This is followed by the next step of the turret, caused by another depression of the treadle t, to carry the support W to station C. Between stations, the support is rotated by the turret to bring the shoe, which left station B toe first, into the reverse position, with the heel in advance as it left station A. At stations C, D and E, similar actions cause, respectively, the coarse-scouring, fine-scouring and brushing of the heel, except that at these stations the cam I, adjusted at station B by its engagement with the contact member 242 actuated by the motor-positioning linkage, exercises complete control over the angle at which the coarse-scouring belt c, the fine-scouring belt d and the brush e are presented to the work. The toplift-projection l is removed by the belt c. At the close of the operating cycle, as the support W returns to station A, the latch 52 is freed to release the work for removal from the support by the operator. During the succeeding operations upon the first shoe, other shoes are being applied successively as the supports arrive at station A, so all the operating mechanisms are acting simultaneously.

Having described my invention, what I claim as new and desire to secure by Letters Patent of the United States is:

1. In a machine for operating upon the edge of a shoe-bottom, a shoe-support, a rotatable tool for operating upon the bottom-edge of a supported shoe, means for moving the support and tool relatively to carry the point of operation of the tool about the edge, means for determining the extent of bodily approach of the tool to the work, and means contacting with the bottom-edge of the shoe for determining the angle between the operating portion of the tool and said edge.

2. In a machine for operating upon the edge of a shoe-bottom, a shoe-support, a rotatable tool for operating upon the bottom-edge of a supported shoe, means for moving the support to present the edge to the tool, motor mechanism for moving the tool to vary the angle between its operating portion and the edge, and means contacting with the edge of the shoe-bottom for controlling the motor mechanism to determine the angle.

3. In a machine for operating upon the edge of a shoe-bottom, a shoe-support, a rotatable tool for operating upon the bottom-edge of a supported shoe, means for moving the support to present the edge to the tool, hydraulic mechanism for moving the tool to vary the angle between its operating portion and the edge, and a feeler contacting with the edge and controlling the hydraulic mechanism.

4. In a machine for trimming a heel having an attached toplift, a shoe-support, a tool for trimming the periphery of a heel upon a supported shoe, means for moving the support and tool relatively to carry the point of operation of the tool about the heel, and means contacting with the toplift along a line limited to close proximity to the tread-surface for determining the angle between the operating portion of the tool and the heel-periphery.

5. In a machine for trimming a heel having an attached toplift, a shoe-support, a tool for trimming the periphery of a heel upon a supported shoe and leaving a projection thereon at the tread-surface of the toplift, means for moving the support and tool relatively to carry the point of operation of the tool about the heel, and means contacting with the top-lift-projection for determining the angle between the operating portion of the tool and the heel-periphery.

6. In a machine for trimming a heel having an attached toplift, a shoe-support, a tool for trimming the periphery of a heel upon a supported shoe and leaving a projection thereon at the tread-surface of the toplift, means for moving the support and tool relatively to carry the point of operation of the tool about the heel, means contacting with the toplift-projection for determining the angle between the operating portion of the tool and the heel-periphery, and means for removing the projection.

7. In a machine for trimming a heel having an attached toplift, a shoe-support, a tool for trimming the periphery of a heel upon a supported shoe and leaving a projection thereon at the tread-surface of the toplift, means for moving the support and tool relatively to carry the point of operation of the tool about the heel, means contacting with the toplift-projection for determining the angle between the operating portion of the tool and the heel-periphery, and a tool for scouring the trimmed surface and removing the projection.

8. In a machine for operating upon the edge of a shoe-bottom, a shoe-support, a rotatable tool for operating upon the bottom-edge of a supported shoe, means for moving the support and tool relatively to carry the point of operation of the tool about the edge, a mounting in which the tool is rotatable and which is arranged to vary the angle of the operating portion of said tool about points in a line bounding the bottom-edge, and means movable under the power of the machine in engagement with the mounting for oscillating said mounting.

9. In a machine for operating upon the edge of a shoe-bottom, a shoe-support, a rotatable tool for operating upon the bottom-edge of a supported shoe, means for moving the support and tool relatively to carry the point of operation of the tool about the edge, a mounting in which the tool is rotatable and which is arranged to vary the angle of the operating portion of said tool about points in a line bounding the bottom-edge, motor mechanism connected to the mounting, and means contacting with said bottom-edge for controlling the motor mechanism.

10. In a machine for operating upon the edge of a shoe-bottom, a shoe-support, a rotatable tool for operating upon the bottom-edge of a supported shoe, means for moving the support and tool relatively to carry the point of operation of the tool about the edge, a mounting for the tool arranged to vary the angle of the operating portion of the tool about points in a line bounding the bottom-edge, hydraulic power mechanism connected to the mounting, and a feeler contacting with the bottom-edge and controlling the hydraulic mechanism.

11. In a heel-trimming machine, a shoe-support, a rotatable heel-trimming and randing tool, means for moving the support and tool relatively to carry the point of operation of the tool about the heel, a mounting for the tool arranged to vary the angle of the operating portion of the tool about points in a line at the juncture of the peripheral wall of the heel and the rand, and means for oscillating the mounting.

12. In a heel-trimming machine, a shoe-support, a rotatable heel-trimming and randing tool, means for moving the support and tool relatively to carry the point of operation of the tool about the heel, a mounting for the tool arranged to vary the angle of the operating portion of the tool about points in a line at the juncture of the peripheral wall of the heel and the rand, means for oscillating the mounting, and means contacting with the heel-periphery for controlling the oscillation of the mounting.

13. In a machine for operating upon shoe-heels, a shoe-support, a motor having a shaft, a tool for operating upon the heels of supported shoes, said tool being supported with and driven by the motor-shaft, and a linkage upon which the motor is pivotally mounted and arranged to vary the angle of the operating portion of the tool to the periphery of a heel, the pivotal connection between the motor and the linkage being movable in an arc about points in a predetermined line upon the periphery of said heel.

14. In a machine for operating upon shoe-heels, a shoe-support, a motor having a shaft and a projection, pulleys rotatable with the shaft and upon the projection, a scouring belt operating over the pulleys, and a linkage upon which the motor is mounted and arranged to vary the angle of the operating portion of the belt to the periphery of the heel.

15. In a machine for operating upon shoe-heels, a shoe-support, a motor having a shaft and a projection, a pulley upon the shaft, a pulley rotatable upon the projection, a scouring belt operating over the pulleys, and a linkage upon which the motor is mounted and having a bifurcated member extending on opposite sides of the belt.

16. In a machine for operating upon shoe-heels, a shoe-support, a motor having a shaft and a projection, a pulley upon the shaft, a pulley rotatable upon the projection and variable in position thereon toward and from the companion pulley, a scouring belt operating over the pulleys, and a linkage upon which the motor is mounted and having a bifurcated member extending on opposite sides of the belt.

17. In a machine for operating upon shoe-heels, a shoe-support, a motor having a shaft, a tool for operating upon the heels of supported shoes, said tool being supported with and driven by the motor-shaft, a linkage upon which the motor is mounted and arranged to vary the angle of the operating portion of the tool to the periphery of a heel about points in a predetermined line, and means movable with the motor for controlling the variation in the angle of the tool.

18. In a machine for operating upon shoe-heels, a shoe-support, a motor having a shaft, a tool for operating upon the heels of supported shoes, said tool being supported with and driven by the motor-shaft, opposite linkages between which the motor is mounted and by which its shaft may be oscillated, and means connected to one of the linkages for oscillating the motor-shaft.

19. In a machine for operating upon shoe-heels, a shoe-support, a motor having a shaft, a tool for operating upon the heels of supported shoes, said tool being supported with and driven by the motor-shaft, opposite linkages between which the motor is mounted and by which its shaft may be oscillated, means connected to one of the linkages for oscillating the motor-shaft, and means movable upon the motor for controlling such oscillation.

20. In a machine for operating upon shoe-heels, a shoe-support, a motor having a shaft, a tool for operating upon the heels of supported shoes, said tool being supported with and driven by the motor-shaft, a linkage upon which the motor is mounted and arranged to vary the angle of the operating portion of the tool to the periphery of a heel about points in a predetermined line, hydraulic mechanism connected to the linkage, and a feeler movable upon the motor for contact with the heel-periphery and controlling the hydraulic mechanism.

21. In a machine for operating upon shoe-heels, a shoe-support, a carrier movable toward and from the support between inactive and active positions, a gage projecting from the carrier and governing its approach to the support, and a tool movable upon the carrier independently of the gage to vary the angular relation of its operating portion to the heel of a supported shoe.

22. In a machine for operating upon shoe-heels, a shoe-support, a carrier movable toward and from the support between inactive and active positions, a gage governing the approach of the carrier to the support, a tool variable in its angular position upon the carrier for operation upon the heel of a supported shoe, means for moving the tool upon the carrier, and means contacting with the heel for controlling the moving means.

23. In a machine for operating upon shoe-heels, a shoe-support, a carrier movable toward and from the support between inactive and active positions, a motor mounted for oscillation upon the carrier, and a tool mounted upon and driven by the motor for operating on a heel upon a supported shoe.

24. In a machine for operating upon shoe-heels, a shoe-support, a carrier movable toward and from the support between inactive and active positions, a motor mounted for oscillation upon the carrier, a tool mounted upon and driven by the motor for operating on a heel upon a supported shoe, means for oscillating the motor, and means contacting with the heel for controlling the oscillating means.

25. In a machine for operating upon shoe-heels, a shoe-support, a carrier movable toward and from the support between inactive and active positions, a tool movable upon the carrier between inactive and active positions and when in active position movable to vary the angle of its operating portion to the heel of a supported shoe, and means for effecting each of the movements of the tool.

26. In a machine for operating upon shoe-heels, a shoe-support, a carrier movable toward and from the support between inactive and active positions, a tool movable upon the carrier between inactive and active positions and when in active position movable to vary the angle of its operating portion to the heel of a supported shoe, and means common to both for effecting each of the movements of the tool.

27. In a machine for operating upon shoe-heels, a shoe-support, a carrier movable toward and from the support between inactive and active positions, a tool movable upon the carrier between inactive and active positions and when in active position movable to vary the angle of its operating portion to the heel of a supported shoe, means common to both for effecting each of the movements of the tool, and means independent of each other for controlling the two movements.

28. In a machine for operating upon shoe-heels, a shoe-support, a carrier movable toward and from the support between inactive and active positions, a tool movable upon the carrier between inactive and active positions and when in active position movable to vary the angle of its operating portion to the heel of a supported shoe, means dependent upon the movements of the carrier for moving the tool to inactive position, and means independent thereof for varying the angle of the tool.

29. In a machine for operating upon shoe-heels, a tool movable between inactive and active positions and when in an active position movable to vary the angle of its operating portion to the heel of a supported shoe, hydraulic mechanism for effecting each of the movements, a valve by which the hydraulic mechanism is controlled, and means independent of each other for actuating the valve to produce the two movements of the tool.

30. In a machine for operating upon shoe-heels, a tool movable between inactive and active positions and when in an active position movable to vary the angle of its operating portion toward a heel, hydraulic mechanism for effecting each of the movements, a valve by which the hydraulic mechanism is controlled, a feeler movable under the influence of the heel of a supported shoe for actuating the valve to produce the variation in the angle of the tool, and other means for actuating the valve to cause the movement of the tool between active and inactive positions.

31. In a machine for operating upon shoe-heels, a shoe-support, a carrier movable toward and from the support between inactive and active positions, a tool movable upon the carrier between inactive and active positions and when in active position movable to vary the angle of its operating portion to the heel of a supported shoe, hydraulic mechanism for effecting each of these movements, a valve by which the hydraulic mechanism is controlled, means dependent upon the movement of the carrier for actuating the valve to move the tool to inactive position, and a feeler movable under the influence of the heel for actuating the valve to produce the variation in the angle of the tool.

32. In a machine for operating upon shoe-heels, a shoe-support, a carrier movable from an inactive position to an active position at the support, said carrier being provided with means contacting with the support to determine the active position, a tool movable upon the carrier for operation on a heel upon a supported shoe, and means for varying the angle of the operating portion of the tool to the heel after the carrier has been positioned by contact with the support.

33. In a machine for operating upon shoe-heels, a work-support having a member arranged to be clamped about the counter-portion of a shoe, a movable carrier contacting with the clamping member, and a tool movable upon the carrier for operation on a heel upon a supported shoe.

34. In a machine for operating upon shoe-heels, a work-support having a member arranged to be clamped about the counter-portion of a shoe and provided with a shoulder extending about it, a carrier having a rotatable gage-member contacting with the clamping member, and a tool movable with the carrier for operation on the heel upon a supported shoe.

35. In a machine for operating upon shoe-heels, a rotatable work-support having a band provided with a gaging surface, a carrier having a gage-disk and being movable from an inactive position to an active position in which the gage-disk contacts with the gaging surface of the band, and a tool movable upon the carrier to vary the angle of its operating portion to the heel upon a supported shoe.

36. In a machine for operating upon shoe-heels, a work-support having a band for clamping the counter-portion of a shoe and about which extends a gaging surface, an arm pivoted to swing toward and from the support, a disk rotatable upon the arm for contact with the gaging surface of the band, and a rotatable tool mounted to oscillate upon the arm and operating on the heel upon a supported shoe.

37. In a machine for operating upon shoe-heels, a work-support having a band for clamping the counter-portion of a shoe and about which extends a gaging surface, an arm pivoted to swing toward and from the support, a bracket variable in position upon the arm, a disk rotatable upon the bracket for contact with the gaging surface of the band, and a rotatable tool mounted to oscillate upon the arm for operating on the heel upon a supported shoe.

38. In a machine for operating upon shoe-heels, a shoe-support, a carrier movable from an inactive position to an active position at the support, a scouring belt movable upon the carrier for operating on the heel upon a supported shoe, a gage arranged to contact with the support to determine the active position of the carrier, and a mounting for the gage movable to free the belt for replacement.

39. In a machine for operating upon shoe-heels, a shoe-support, a carrier movable from an inactive position to an active position at the support, a scouring belt movable upon the carrier for operating on the heel upon a supported shoe, a gage arranged to contact with the support to determine the active position of the carrier, a bracket pivoted to move laterally of the belt and upon which the gage is mounted, and means for securing the bracket with the gage in position for contact with the support.

40. The combination with a work-support, of a tool co-operating with the support and being movable into different operating positions, means for moving the support and tool relatively to shift the point of operation of the tool about the supported work, a device having a controlling surface variable in form, and means for transmitting movements of the tool to the device to change the form of the controlling surface as the point of operation of the tool changes.

41. The combination with a work-support, of a tool co-operating with the support and being movable into different operating positions, means for moving the support and tool relatively to shift the point of operation of the tool about the supported work, a cam having movable sections furnishing a tool-controlling surface, and means for transmitting movements of the tool to the sections to change their positions.

42. The combination with a work-support, of a tool co-operating with the support and being movable into different operating positions, means for moving the support and tool relatively to shift the point of operation of the tool about the supported work, a device having a controlling surface variable in form, means for transmitting movements of the tool to the device to change the form of the controlling surface as the point of operation of the tool changes, means for retaining the device in the form to which it is changed by the tool, and means for releasing the device from the retaining means.

43. The combination with a work-support, of a tool co-operating with the support and being movable into different operating positions, means for moving the support and tool relatively to shift the point of operation of the tool about the supported work, a cam having movable sections furnishing a tool-controlling surface, means for transmitting movements of the tool to the sections to change their positions, and means for locking the sections in their adjusted positions.

44. The combination with a work-support, of a tool co-operating with the support and being movable into different operating positions, means for moving the support and tool relatively to shift the point of operation of the tool about the supported work, a cam having movable sections furnishing a tool-controlling surface, means for transmitting movements of the tool to the sections to change their positions, means for locking the sections in their adjusted positions, and means for releasing the sections.

45. The combination with a tool movable into different operating positions, of a movable work-support co-operating with the tool, and a device movable with the work-support and having a series of tool-controlling sections movable with the tool.

46. The combination with a tool movable into different operating positions, of a movable work-support co-operating with the tool, a device movable with the work-support and having a series of controlling sections, and a member movable by the tool and contacting successively with the sections to position them.

47. The combination with a tool movable into different operating positions, of a movable work-support co-operating with the tool, a device movable with the work-support and having a series of controlling sections movable with the tool, a piston by which each section is carried, a cylinder containing the piston, and means for controlling the flow of fluid between opposite ends of the cylinder.

48. The combination with a tool movable into different operating positions, of a movable work-support co-operating with the tool, a device movable with the work-support and having a series of controlling sections movable with the tool, a piston by which each section is carried, a cylinder containing the piston, a spring normally elevating the piston, and a valve for controlling the flow of fluid between opposite ends of the cylinder.

49. The combination with a tool movable to different operating positions, of a rotatable work-support co-operating with the tool, a series of contact members arranged in an arc about the support, and a member movable by the tool to position the contact members successively as the support rotates.

50. The combination with a tool movable to different operating positions, of a rotatable work-support co-operating with the tool, a series of contact members arranged in an arc about the support, a member movable by the tool to position the contact members successively as the support rotates, valves by which the contact members are locked as thus positioned, and a member past which the valves are carried in the rotation of the support for actuating said valves.

51. The combination with a tool movable to different operating positions, of a rotatable work-support co-operating with the tool, a series of contact members arranged in an arc about the support, a member movable by the tool to position the contact members successively as the support rotates, valves by which the contact members are locked as thus positioned, and a member past which the valves are carried in the rotation of the support and arranged to hold a portion of the valves normally with the members unlocked and thereafter to unlock succeeding members.

52. The combination with a tool movable to different operating positions, of a rotatable work-support co-operating with the tool, a series of contact members arranged in an arc about the support, a member movable by the tool to position the contact members successively as the support rotates, valves by which the contact members are locked as thus positioned, a member past which the valves are carried in the rotation of the support for actuating said valves to unlock the members, and means associated with the last valve of the series to move the actuating member and permit such valves to lock.

53. The combination with a tool movable to different operating positions, of a rotatable work-support co-operating with the tool, a series of contact members arranged in an arc about the support, a member movable by the tool to position the contact members successively as the support rotates, rolls radiating from the work-support, and a convexly curved member contacting with the rolls and movable by the tool.

54. The combination with a movable work-support, of yieldable controlling sections carried thereby, one of the sections having a positioning portion and an inclined surface leading thereto, a carrier movable from an inactive position to an active position at the support, a tool movable upon the carrier in co-operation with the work-support, and a contact member movable by the carrier against the inclined surface of the section and thereafter movable upon the carrier to depress the section and engage the positioning portion.

55. The combination with a movable work-support, of yieldable controlling sections carried thereby, one of the sections having a positioning portion and an inclined surface leading thereto, a carrier movable from an inactive position to an active position at the support, a tool movable upon the carrier in co-operation with the work-support, and a contact member mounted upon the carrier and movable thereby against the inclined surface of the section and thereafter movable with the tool upon the carrier to pass over the inclined surface and engage the positioning portion.

56. The combination with tools movable to different operating positions, of a work-support, said tools and support being relatively movable to present the work to receive the successive action of the tools, and a device set by the movements of one tool and when thus set controlling the action of another tool.

57. The combination with tools movable to different operating positions, of a work-support, said tools and support being relatively movable to present the work to receive the successive action of the tools, and a cam variable in form under the influence of one tool and when thus formed controlling the action of another tool.

58. The combination with tools movable to different operating positions, of a work-support, said tools and support being relatively movable to present the work to receive the successive action of the tools, a device set in accordance with the movements of one tool and when thus set controlling the action of another tool, means for unlocking the device in preparation for setting, and means for locking the device when set.

59. The combination with a work-support, of means for moving the support to different stations, mechanism at one of the stations for operating upon the supported work, variable means for controlling the effect of the operating mechanism upon the supported work, and means arranged to adjust the controlling means at one of the stations, such adjusted controlling means thereafter altering the effect of the operating mechanism at another than the adjusting station.

60. The combination with a shoe-support, of means for moving the support to different stations, mechanism at one of the stations for operating upon a supported shoe, a variable cam, and means for adjusting the cam at one of the stations, said cam thereafter altering the operation of the operating mechanism upon a supported shoe at another than the adjusting station.

61. The combination with a rotatable turret, of a plurality of work-supports mounted upon the turret and movable thereby to different stations, operating mechanisms at the stations to which the work is successively presented by the supports, variable means for controlling at different stations the effect of the operating mechanisms upon the supported work, and means arranged to adjust the controlling means at one of the stations, such adjusted controlling means thereafter acting to alter the effect of the operating mechanisms at succeeding stations.

62. The combination with a rotatable turret, of a plurality of shoe-supports movable upon the turret and movable by said turret to different stations, movable mechanisms at the stations to which shoes are presented by the supports for successive operations upon them, a variable cam, and means for setting the cam at one station, said cam thereafter acting to move the work-supports and operating mechanism relatively at succeeding stations.

63. The combination with tools situated at different stations and assuming thereat different operating positions, of a work-support movable through these stations for co-operation with the tools, and a device associated with the support, said device being set during the movement of a tool at one station and when thus set controlling the positions of the tool at another station.

64. The combination with tools situated at different stations and assuming thereat different operating positions, of a work-support movable through these stations for co-operation with the tools, a device associated with the support, said device having sections variable in position, a member actuated by the tool at one station for positioning the sections, and a member movable by the positioned sections for moving the tool at another station.

65. The combination with tools situated at different stations and assuming thereat different operating positions, of a work-support movable through these stations for co-operation with the tools, a cam associated with the work-support and including movable sections, means connected to the tool at one station for positioning the sections, and means engaging the positioned cam at another station for positioning the tool thereat.

66. In a machine for operating upon shoe-heels, a rotatable turret, a series of shoe-supports rotatable upon the turret, a cam rotatable with each support, said cam consisting of a series of variable sections and generally conforming to the peripheral contour of a heel, a series of stations having movable tools to which the shoe-supports are successively presented by the turret, a member movable with the tool at one station for positioning the sections of the cam, and a member engaging the positioned cam for moving the tool at another station.

67. In a machine for operating upon shoe-heels, a rotatable turret, a series of shoe-supports rotatable upon the turret, a cam rotatable with each support, said cam consisting of a series of variable sections and generally conforming to the peripheral contour of a heel, a series of stations having movable tools to which the shoe-supports are successively presented by the turret, means contacting with the heel at one station for determining the position of the tool, a member movable with the thus-positioned tool for positioning the sections of the cam, and a member engaging the positioned cam and moving the tool at another station.

68. In a machine for operating upon shoe-heels, a rotatable turret, a series of shoe-supports rotatable upon the turret, a cam rotatable with each support, said cam consisting of a series of variable sections and generally conforming to the peripheral contour of a heel, a series of stations having movable tools including a trimming cutter and a scouring belt to which the shoe-supports are successively presented by the turret, a member movable with the trimming cutter for positioning the sections of the cam, and a member engaging the positioned cam for moving the scouring belt.

69. In a machine for operating upon shoe-heels, a rotatable turret, a series of shoe-supports rotatable upon the turret, a cam rotatable with each support, said cam consisting of a series of variable sections and generally conforming to the peripheral contour of a heel, a series of stations having movable tools to which the shoe-supports are successively presented by the turret, a feeler contacting with the heel at one station, hydraulic mechanism controlled by the feeler for determining the position of the tool at that station, a member movable with the thus-positioned tool for positioning the sections of the cam, and a member engaging the positioned cam for moving the tool at another station.

70. In a machine for operating upon shoe-heels, a rotatable turret, a work-support arranged to receive the counter-portion of a shoe and having a guide-surface, the work-support being carried by the turret through a plurality of stations at one of which it is clamped upon the counter-portion of a shoe, and operating mechanisms at the other stations provided with means engaging the guide-surface of the work-support.

71. In a machine for operating upon shoe-heels, a rotatable turret, a support rotatable upon the turret and having a work-clamping band provided with a guide-shoulder, the support being carried by the turret through a plurality of stations at one of which the band is clamped upon the counter-portion of a shoe, and operating mechanisms at other stations provided with disks engaging the shoulder of the band.

72. In a machine for operating upon shoe-heels, a rotatable turret, a series of shoe-supports rotatable upon the turret, a series of stations at each of which is a carrier movable toward and from the turret, a motor mounted to oscillate upon each carrier and having a shaft, a tool actuated by each shaft, and means for oscillating each motor upon its carrier to present its tool at different angles to a heel upon a supported shoe.

73. In a machine for operating upon shoe-heels, a rotatable turret, a series of shoe-supports rotatable upon the turret, a series of stations at each of which is a carrier movable toward and from the turret, a motor mounted to oscillate upon each carrier and having a shaft, a tool actuated by each shaft, means for oscillating the motor at one of the stations upon its carrier under the control of a heel upon a supported shoe to present its tool at different angles to said heel, and means set in accordance with such angles to present to the heel the tool at another station at corresponding angles.

74. In a machine for operating upon shoe-heels, a rotatable turret, a series of shoe-supports rotatable upon the turret, a series of stations at each of which is a carrier movable toward and from the turret, a motor mounted to oscillate upon each carrier and having a shaft, a heel-trimming cutter actuated by one shaft, a heel-scouring belt actuated by another shaft, the motor of the heel-trimming cutter being movable upon its carrier under the control of a heel upon the supported shoe to present its cutter at different angles to said heel, and means set in accordance with such angles to present to the heel the scouring belt at corresponding angles.

75. In a machine for operating upon shoe-heels, a rotatable turret, a shoe-support rotatable upon the turret, a plurality of carriers into co-operation with which the support is successively moved by the turret, and a tool mounted upon each carrier to oscillate about points in a line which is the same for all the carriers and which is determined independently of engagement with the work.

76. In a machine for operating upon shoe-heels, a rotatable turret, a shoe-support rotatable upon the turret, a plurality of carriers into co-operation with which the support is successively moved by the turret, linkages pivoted upon each carrier, and a tool supported upon the linkages of each carrier to oscillate about points in the meeting line between the periphery of the heel and the rand of the supported shoe.

77. The combination with a tool movable into different operating positions, of a device associated with the tool and having a controlling surface variable in form, means for transmitting movements of the tool to the device to change the form of the controlling surface, and a work-support with which the tool co-operates and which is constructed and arranged to hold the work in a predetermined relation to the controlling device.

78. The combination with a tool movable to different operation positions, of a cam associated with the tool and having sections variable in position, means for transmitting movements of the tool to the cam to change the positions of the sections, and a shoe-support about which the cam extends and having opposite clamping portions movable toward and from each other.

79. The combination with a tool movable to different operating positions, of a cam associated with the tool and having sections variable in position, means for transmitting movements of the tool to the cam to change the positions of the sections, a shoe-support about which the cam extends, a breast-gage associated with the support, and means for forcing the heel-breast against the gage.

80. The combination with a tool movable to different operating positions, of a cam associated with the tool and having sections variable in position, means for transmitting movements of the tool to the cam to change the positions of the sections, a shoe-support about which the cam extends and having opposite clamping portions movable toward and from each other, a breast-gage associated with the support, and means for forcing the heel-breast against the gage.

81. The combination with a tool movable to different operating positions, of a cam associated with the tool and having sections variable in position, means for transmitting movements of the tool to the cam to change the positions of the sections, and a band arranged to clamp the counter-portion of a shoe and about which the cam extends.

82. The combination with a tool movable to different operating positions, of a cam associated with the tool and having sections variable in position, means for transmitting movements of the tool to the cam to change the positions of the sections, a band arranged to receive the counter-portion of a shoe and generally conforming thereto, about which band the cam extends, and means arranged to clamp the band upon the shoe and to lock it in work-retaining relation.

83. The combination with a tool movable to different operating positions, of a cam associated with the tool and having sections variable in position, means for transmitting movements of the tool to the cam to change the positions of the sections, a band of general horseshoe form arranged to clamp the counter-portion of a shoe and about which the cam extends, and a breast-gage movable across the opening between the arms of the band.

84. In a shoe-support, a band arranged to surround the counter-portion of a shoe, guides for the rear and sides of the band permitting its movement, means acting upon the rear and sides of the band for forcing it into clamping engagement with the shoe, and means for locking the sides of the band against movement.

85. In a shoe-support, a band arranged to surround the counter-portion of a shoe, brackets by which the rear and sides of the band are supported, all of said brackets being mounted for movement longitudinally of the supported shoe and under the influence of said shoe as it is applied to the band, and means for forcing the sides of the band toward each other.

86. In a shoe-support, a band arranged to surround the counter-portion of a shoe, brackets by which the rear and sides of the band are supported, all of said brackets being mounted for movement longitudinally of the supported shoe, a spring acting to force the rear bracket normally forward, and means for forcing the sides of the band toward each other.

87. In a shoe-support, clamping means movable into engagement with a shoe, opposite actuating levers for the clamping means, opposite links forming toggles with the actuating levers, a reciprocatory spindle to which the links are connected, and means movable against the levers for locking them in their actuating positions.

88. In a shoe-support, clamping means movable into engagement with a shoe, opposite actuating levers for the clamping means, means for oscillating the levers, a member movable into locking engagement with each lever, and a wedge movable between the locking members.

89. In a shoe-support, clamping means movable into engagement with a shoe, opposite actuating levers for the clamping means, a reciprocatory spindle for oscillating the levers, a locking member for each lever, and a wedge movable by the spindle between the locking members.

90. In a shoe-support, clamping means movable into engagement with a shoe, opposite actuating levers for the clamping means, a reciprocatory spindle for oscillating the levers, a locking member for each lever, a wedge movable between the locking members, and a spring interposed between the spindle and the wedge.

91. In a shoe-support, clamping means having opposite sides between which the counter-portion of a heeled shoe may be inserted, and a yieldable heel-breast-gage movable by the shoe to one side of its path upon its entrance between the sides of the clamping means.

92. In a shoe-support, clamping means having opposite sides between which the counter-portion of a heeled shoe may be inserted, a yieldable heel-breast-gage movable by the shoe to one side of its path upon its entrance between the sides of the clamping means, and means for urging the heel-breast against the gage.

93. In a shoe-support, a clamping band movable into engagement with a shoe, opposite actuating levers upon which the band is supported, and a breast-gage carried by one of the actuating levers.

HENRY B. GREENOUGH.